US012606209B2

(12) United States Patent
Liu et al.

(10) Patent No.: US 12,606,209 B2
(45) Date of Patent: Apr. 21, 2026

(54) LANE BIASING FOR NAVIGATING MACHINES

(71) Applicant: NVIDIA Corporation, Santa Clara, CA (US)

(72) Inventors: Dongran Liu, Kirkland, WA (US); Jeremy Ma, San Jose, CA (US); Minwoo Park, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 223 days.

(21) Appl. No.: 18/164,979

(22) Filed: Feb. 6, 2023

(65) Prior Publication Data

US 2024/0043040 A1 Feb. 8, 2024

Related U.S. Application Data

(60) Provisional application No. 63/395,313, filed on Aug. 4, 2022.

(51) Int. Cl.
*B60W 60/00* (2020.01)
*B60W 30/12* (2020.01)
(52) U.S. Cl.
CPC ........ *B60W 60/0015* (2020.02); *B60W 30/12* (2013.01); *B60W 60/0011* (2020.02); *B60W 2554/20* (2020.02); *B60W 2554/801* (2020.02)
(58) Field of Classification Search
None
See application file for complete search history.

(56) References Cited

U.S. PATENT DOCUMENTS

| | | | | |
|---|---|---|---|---|
| 9,393,998 | B2 * | 7/2016 | Clarke | B60T 13/662 |
| 10,471,954 | B2 * | 11/2019 | Saiki | G08G 1/165 |
| 10,474,416 | B1 | 11/2019 | Farivar et al. | |
| 10,545,029 | B2 | 1/2020 | Yang et al. | |
| 10,705,525 | B2 | 7/2020 | Smolyanskiy et al. | |
| 10,997,433 | B2 | 5/2021 | Xu et al. | |
| 10,997,435 | B2 | 5/2021 | Abbott et al. | |
| 11,173,902 | B2 * | 11/2021 | Ohmura | B60W 30/18163 |
| 11,442,450 | B2 * | 9/2022 | Yao | B60W 30/12 |
| 11,827,241 | B2 * | 11/2023 | Seccamonte | B60W 60/0016 |
| 11,834,068 | B2 * | 12/2023 | Watanabe | B60W 60/0015 |
| 12,071,160 | B2 * | 8/2024 | Liu | B60W 40/10 |

(Continued)

*Primary Examiner* — Todd Melton
(74) *Attorney, Agent, or Firm* — IRON SUMMIT IP LLP

(57) ABSTRACT

In various examples, lane biasing for navigating around objects in autonomous systems and applications is described. Systems and methods are disclosed that generate lane (or other demarcated regions of an environment) geometries in environments—such as environments without clear lane or boundary demarcations—by using locations and poses of static objects and/or outputs of a drivable free-space analysis. The systems and methods then use the lane geometries, the locations of the static objects, and current paths (e.g., centerlines of the current paths) along the lanes to determine new paths for navigating around the static objects. For instance, the new paths may be determined by shifting the centerlines of the current paths in directions away from the static objects by some distance or safety margin. This way, the vehicles may navigate around the static objects with greater distances between the vehicles and the static objects for increased safety.

20 Claims, 16 Drawing Sheets

(56) References Cited

U.S. PATENT DOCUMENTS

2019/0384304 A1    12/2019   Towal et al.
2020/0249674 A1     8/2020   Dally et al.
2021/0001877 A1     1/2021   Han et al.

* cited by examiner

1000

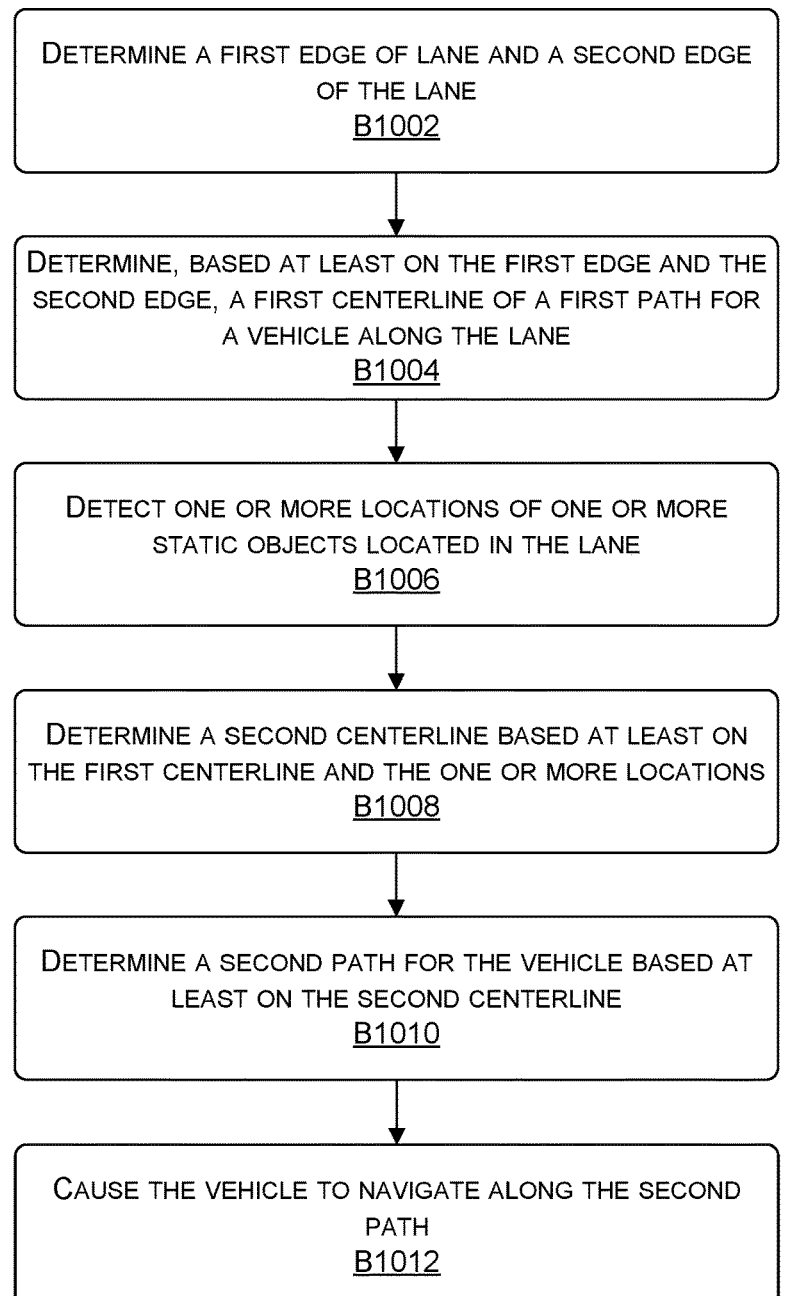

DETERMINE A FIRST EDGE OF LANE AND A SECOND EDGE OF THE LANE
B1002

DETERMINE, BASED AT LEAST ON THE FIRST EDGE AND THE SECOND EDGE, A FIRST CENTERLINE OF A FIRST PATH FOR A VEHICLE ALONG THE LANE
B1004

DETECT ONE OR MORE LOCATIONS OF ONE OR MORE STATIC OBJECTS LOCATED IN THE LANE
B1006

DETERMINE A SECOND CENTERLINE BASED AT LEAST ON THE FIRST CENTERLINE AND THE ONE OR MORE LOCATIONS
B1008

DETERMINE A SECOND PATH FOR THE VEHICLE BASED AT LEAST ON THE SECOND CENTERLINE
B1010

CAUSE THE VEHICLE TO NAVIGATE ALONG THE SECOND PATH
B1012

FIGURE 10

STEREO CAMERA 1168

MID-RANGE CAMERA, WING MIRROR MOUNT 1198

SURROUND CAMERA 1174

MID-RANGE CAMERA, WING MIRROR MOUNT 1198

SURROUND CAMERA(S) 1174

1100

SURROUND CAMERA(S) 1174

INFRARED CAMERA 1172

WIDE VIEW CAMERA 1170

LONG-RANGE CAMERA 1198

LONG-RANGE CAMERA 1198

STEREO CAMERA 1168

SERVER(S) 1178

CPU 1180(B)

PCIE SWITCH 1182(D)

PCIE SWITCH 1182(C)

GPU 1184(F)

GPU 1184(H)

GPU 1184(E)

GPU 1184(G)

1186

CPU 1180(A)

PCIE SWITCH 1182(B)

PCIE SWITCH 1182(A)

GPU 1184(B)

GPU 1184(D)

1188

GPU 1184(A)

GPU 1184(C)

1194

1192

1100

NETWORK(S) 1190

1176

1300

LANE BIASING FOR NAVIGATING MACHINES

CROSS-REFERENCE TO RELATED APPLICATIONS

This application claims the benefit of U.S. Provisional Application No. 63/395,313, filed on Aug. 4, 2022, which is hereby incorporated by reference in its entirety.

BACKGROUND

Autonomous vehicles often navigate through environments without clearly demarcated lanes or paths. For example, when driving in residential areas where there are no lane markings, the boundaries of the road (e.g., defined by curbs, grass, barriers, etc.) and/or a centerline of the road are often the only indicators available for demarcating the drivable space. As such, to navigate along paths or roads of these types, autonomous systems may identify the entire street as a single lane, and drive down the middle of the street, or may identify a lane as one side of the street (e.g., split between the edge of the road and the middle of the road), and drive in the middle of the particular side of the street. However, where static objects are present—e.g., parked vehicles, bicycles, motorcycles, storage containers, recreation vehicles, trash cans, boats on trailers, etc.—the autonomous systems may identify these static objects as being in a lane of travel of the vehicle (e.g., in an ego-lane), and thus may come to a stop to avoid a collision.

In some examples, such as where the direct path of travel (e.g., along a side of road) does not have a static object directly in the path, the vehicle may navigate very closely to the static objects, even where there may be ample space between the static objects and the center of the road that would allow the vehicle to traverse the area at a greater distance from the static objects. As such, in many instances, these roads or paths with static objects are wide enough for the autonomous vehicles to navigate around them safely, but the underlying system of the vehicle may prevent such navigation or may navigate unnecessarily close to the static objects.

SUMMARY

Embodiments of the present disclosure relate to lane biasing for navigating in autonomous systems and applications. Systems and methods are disclosed that generate lane (or other demarcated regions or paths of an environment) geometries in environments—such as environments without clear lane or boundary demarcations—by using locations and/or poses of static objects and/or outputs of a drivable free-space analysis. The systems and methods then use the lane geometries, the locations of the static objects, and current paths (e.g., centerlines of the current paths) along the lanes to determine new paths for navigating around the static objects. For instance, the new paths may be determined by shifting the centerlines of the current paths in directions away from the static objects and by one or more distances. This way, the vehicles are able to navigate around the static objects with greater distances between the vehicles and the static objects for increased safety.

Using this updated lane or path information, a planning component of the vehicle may use various perception outputs—e.g., from path perception, obstacle perception, free-space perception, etc.—to determine a path or trajectory along the lane. In addition, because the obstacle perception information may include detailed semantic information—e.g., vehicle, parked vehicle, static object, dynamic object, etc.—the identification of a parked vehicle or other static object or obstacle may allow for navigating around the static object using different techniques. For example, a parked vehicle may be navigated around similar to any other static object, while a currently stopped (but not parked) vehicle may be navigated around more slowly—such as by coming to a stop initially, and then navigating once the vehicle remains stopped. In this way, the vehicle may safely navigate around static objects without falsely identifying static objects as objects in the path of the vehicle, and/or without traversing the road or path unnecessarily close to the static objects.

BRIEF DESCRIPTION OF THE DRAWINGS

The present systems and methods for lane biasing for navigating in autonomous and semi-autonomous systems and applications are described in detail below with reference to the attached drawing figures, wherein:

FIG. 10 is a flow diagram showing a method for using a current path of a vehicle and a location(s) of an object(s) within a lane to determine a new path for the vehicle, in accordance with some embodiments of the present disclosure;

DETAILED DESCRIPTION

Figure 1:
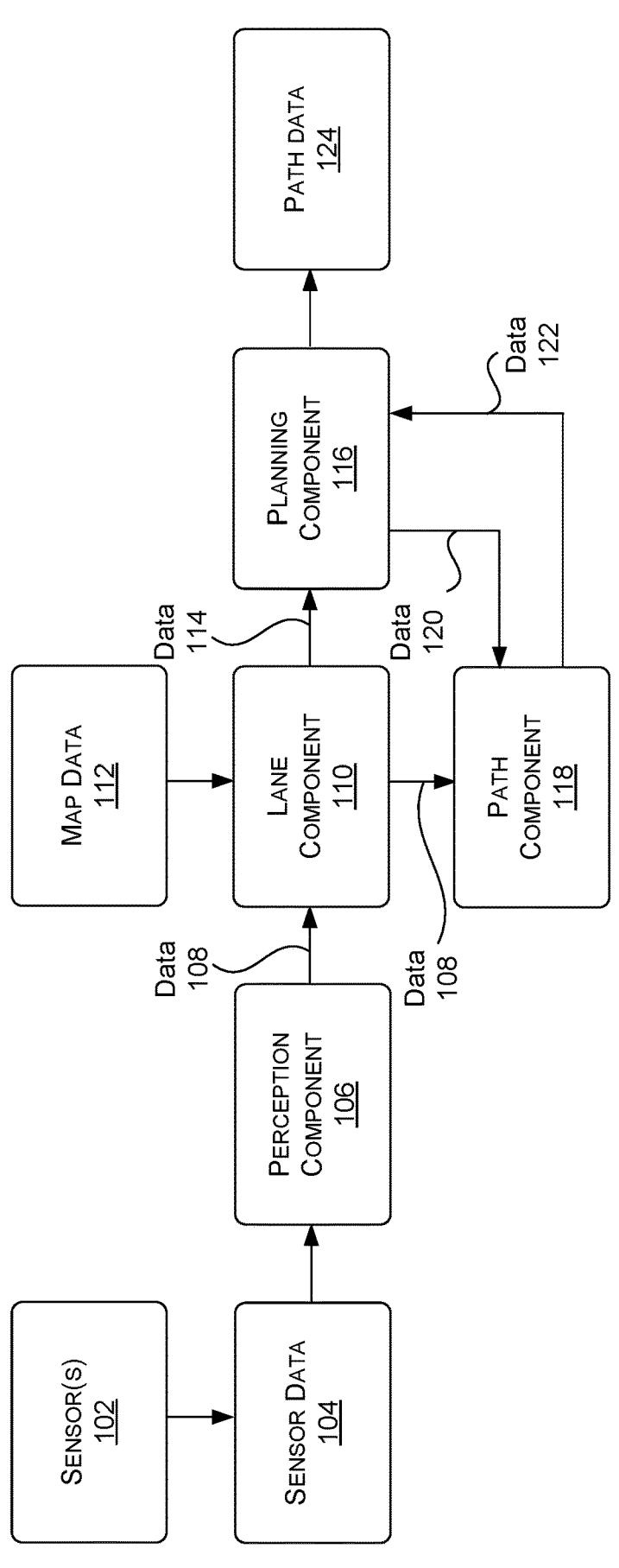
FIG. 1 illustrates an example of a data flow diagram for a process of using lane biasing for navigating around objects within an environment, in accordance with some embodiments of the present disclosure.

Systems and methods are disclosed related to lane biasing for navigating around objects in semi-autonomous or autonomous systems and applications. Although the present disclosure may be described with respect to an example autonomous or semi-autonomous vehicle or machine 1100 (alternatively referred to herein as "vehicle 1100" or "ego-machine 1100," an example of which is described with respect to FIGS. 11A-11D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to lane biasing for navigating, this is not intended to be limiting, and the systems and methods described herein may be used in augmented reality, virtual reality, mixed reality, robotics, security and surveillance, autonomous or semi-autonomous machine applications, and/or any other technology spaces where lane biasing for navigating may be used.

For instance, a system(s) may receive sensor data generated using one or more sensors of a vehicle while navigating through an environment. The system(s) (e.g., a path perception system) may then determine, based at least on at least a portion of the sensor data, a predicted path for the vehicle through an environment. For instance, the system(s) may predict the path based on a current location of the vehicle within the environment, one or more prior locations of the vehicle within the environment, information (e.g., a location(s), a pose(s), a speed(s), an acceleration(s), etc.) associated with an object(s) (e.g., another vehicle(s), a pedestrian(s), a structure(s), a road barrier(s), etc.), free-space information associated with the environment, and/or any other information. In some examples, the path for the vehicle is along a lane of travel that the vehicle is to navigate within the environment.

For example, the system(s) may use map data (e.g., from a high-definition (HD) map) to determine lane locations and/or classifications in two-dimensional (2D) image space and/or three-dimensional (3D) world space. As another example, and additionally or alternatively to using the map data, one or more machine learning models (e.g., deep neural networks (DNNs)) may be used to generate lane representations. The DNNs may use the sensor data (e.g., image data, LiDAR data, RADAR data, etc.) to generate one or more outputs indicative of lane locations and/or classifications. For example, using the map data and/or the DNN, the lane representations may correspond to locations of one or more lanes—e.g., a vehicle's lane, a lane(s) right of the vehicle, a lane(s) left of vehicle, and so on. As such, the classifications may correspond to whether the lane is the vehicle's lane or another lane relative to the vehicle. In some examples, the classifications may be irrespective of the vehicle, and thus may include classifiers such as furthest right lane, furthest left lane, etc., or may include identifiers such as lane 1, lane 2, lane 3, etc. One or more lanes (e.g., each lane) may be represented using lane edges (e.g., a right edge and a left edge) and/or a centerline or rail.

In some examples, to determine the path through the vehicle's lane, the system(s) may initially determine a geometry of the lane. For example, the geometry may include a boundary line (e.g., edges) on both sides of the lane, and a centerline (or rail) of the lane (e.g., generally in the middle of the two boundary lines). In some examples, the system(s) may determine the path of the vehicle within the lane using the centerline or rail of the lane that corresponds to the path. In this way, a centerline of the vehicle may be aligned with the centerline of the lane to allow the vehicle to traverse the lane in the middle of the lane (and/or substantially in the middle of the lane). However, in other examples, the system(s) may determine the path using one or more additional and/or alternative techniques.

In some examples, the vehicle may have one or more static obstacles (e.g., parked vehicles, storage containers, trash cans, etc.) occupying at least a portion of the lane. This may occur in various environments. For a first example, this may occur in a residential environment where a lane may be wide enough for moving vehicles to traverse as well as for vehicles to safely park to the side. For a second example, this may occur at a park or other venue, where the venue allows for parking along, e.g., a curb of the park, while the remainder of the lane is available for vehicles to traverse within close proximity to the parked vehicles. In examples where the vehicle is to traverse a lane that includes a static obstacle occupying at least a portion of the lane, the vehicle may end up in a state where the static object(s) is in the path or unnecessarily close to the path of the vehicle.

As such, the system(s) may allow for the vehicle to traverse the lane that includes the static object(s) at a safe distance from the static object(s) without requiring the vehicle to come to a stop or slow down. For instance, and in some examples, the system(s) may use a classification(s) associated with an object(s) located within the lane to determine that the object(s) includes a static object(s). For example, the classification associated with an object may include an object class (e.g., a car, sedan, truck, pedestrian, vehicle, bicyclist, trash can, recreational vehicle, small object, large object, etc.) and/or an object state (e.g., dynamic, static, parked, moving, etc.). Using this classification information, the system may determine that there are one or more static objects in the same lane as the vehicle. The system(s) may then use the object class and/or the object state to determine that the object is a static object (at least in its current state).

Once the static object(s) is identified, the system(s) may use the presence (e.g., location, size, pose, etc.) of the static object(s) within the lane to generate and/or update one or more of the lines, edges, centerlines, and/or other lane or path representations used to represent the lane or path. For instance, the system(s) may determine the size of a static object—or at least the lateral width or extent—using various approaches. For a first example, the width may be estimated using the classification information and a corresponding estimated width. In such an example, if the class of the static object is a sedan, the width may be estimated as five feet, and if the class of the static object is a trash can, the width may be estimated as two and a half feet. As such, based on the detected location of the object, and a detected centerline/point, the width may be used to determine the extent that the object protrudes into the lane. For a second example, a detection of the static object may be used to determine the size of the object. For instance, if detected in 2D image space using a bounding shape, the bounding shape may be projected to 3D world space, and a width of the bounding shape in 3D world space may be used to determine the width of the object. For a third example, a number of pixels of width of the bounding shape and an estimated distance (e.g., in world space) may be used to determine the size—e.g., using a lookup table, or a conversion function. In any of these examples, the system(s) may determine the width or extent of the object(s) extending into the lane (e.g., perpendicular to a direction of travel along the lane), and then use that in the adjustment of the lane representation(s). In some embodiments, the lateral and/or longitudinal extent of an object—or a bounding shape corresponding thereto—may be increased by some safety margin to increase the buffer between the objects and the ego-vehicle during the navigation around the objects. For example, where the system believes a vehicle to be 0.5 meters wider than it actually is, the starting point for navigating around the object already has a buffer of 0.5 meters built in, and additional buffers can be determined by the path or behavior planner to further increase the distance from the static object(s).

Once the size of the static object(s) is determined, the system(s) may generate and/or update lane representations (e.g., lines or edges or dividers, centerlines, etc.) to account for the static object(s). For example, the system(s) may determine a first edge (e.g., a right edge) of the lane corresponding to a road boundary, a second edge (e.g., a left edge) of the lane corresponding to another road boundary, a third edge (e.g., an updated right edge) corresponding to a left side(s) of a static object(s) located proximate to the first edge, a fourth edge (e.g., an updated left edge) corresponding to a right side(s) of a static object(s) located proximate to the second edge, and/or a fifth edge that is associated with a center of the lane. The system(s) may then use one or more of those edges in order to determine a new centerline of a new path (e.g., a shifted centerline from the original centerline of the original path) for the vehicle such that the vehicle avoids a collision with the static object(s) and/or maintains a greater buffer between the vehicle and the static object(s).

In some examples, the system(s) may perform one or more techniques to determine the new centerline associated with the new path. For a first example, the system(s) may continue to shift the original centerline of the original path in a direction that is away from the static object(s) (e.g., the third edge) until the shifted centerline provides the new path that avoids the collision with the static object(s) and/or creates the greater buffer between the vehicle and the static object(s). In such an example, the system(s) may shift the original centerline by given increments, such as 0.1 meters, 0.5 meters, 1 meter, 2 meters, and/or any other distance. For a second example, the system(s) may determine the new centerline based on the side(s) of the static object(s) (e.g., the third edge or the fourth edge) and the fifth edge, such as by centering the new centerline between the side(s) of the static object(s) and the fifth edge, causing the new centerline to provide a new path that again avoids the collision with the static object(s) and/or creates the greater buffer between the vehicle and the static object(s). While these are just a couple example techniques of how the system(s) may determine the new centerline, in other examples, the system(s) may use additional and/or alternative techniques to determine the new centerline.

In some embodiments, the system(s) may use temporal smoothing to avoid large step functions in the provided lane representation or centerline thereof in the signal to the behavior planner (BP). For example, if a new lane representation or centerline thereof were updated at each frame, or even at every five frames, the vehicle may be shifting back and forth (e.g., left to right) within the lane unnecessarily (e.g., based on the spacing of the static objects located within the lane). As such, the system(s) may use a horizon threshold distance (e.g., 50 meters, 100 meters, 250 meters, 500 meters, etc.) and/or horizon threshold time (e.g., 1 second, 5 seconds, 10 seconds, etc.) when generating the new centerlines for the new paths. For instance, the system(s) may generate a pre-smoothed lane representation or centerline thereof that extends some distance into the future and/or some distance into the future given a time window and a current velocity and/or acceleration of the vehicle. This may avoid too frequent of lateral shifts in the lane, and may provide more comfort for the passengers of the vehicle as well as less compute requirements on the system(s).

In some examples, the system(s) may use one or more events to determine when to perform the processes described herein with respect to shifting the centerline of the path. For a first example, the system(s) may determine to perform the processes described herein to shift the centerline of the path when the vehicle is navigating in a first type(s) of environment(s), such as in rural environments, metropolitan environments, suburban environments, and/or the like, but determine not to perform the processes described herein to shift the centerline of the path when the vehicle is navigating in a second type(s) of environment(s), such as in highway environments, interstate environments, intersection environments, and/or the like. For a second example, the system(s) may determine to perform the processes described herein to shift the centerline of the path when traveling at first velocities, such as first velocities that are less than a threshold velocity, but determine not to perform the processes described herein to shift the centerline when traveling at second velocities, such as second velocities that are equal to or greater than the threshold velocity. While these are just a couple examples of events that may cause the centerline shifting processes to be activated and/or deactivated, in other examples, the centerline shifting processes may be activated and/or deactivated based on additional and/or alternative events.

While the examples described herein include determining new paths for navigating around static objects, in some examples, similar processes may be used to navigate around dynamic objects. For example, if a dynamic object is moving with a velocity, but in a pattern (e.g., forward and backward type pattern) such that the dynamic object remains substantially within an area of the lane, then the system(s) may perform similar processes as those described herein to determine a new path for navigating a vehicle around the object. In other words, the processes described herein may be used to navigate around objects that continue to occupy areas of lanes, such as for a threshold period of time (e.g., ten seconds, thirty seconds, one minute, five minutes, etc.).

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example of a data flow diagram for a process 100 of using lane biasing for navigating around static objects within an environment, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous or semi-autonomous vehicle or machine 1100 of FIGS. 11A-11D, example computing device 1200 of FIG. 12, and/or example data center 1300 of FIG. 13.

The process 100 may include one or more sensors 102 generating sensor data 104. For instance, a vehicle may include the sensor(s) 102 that generates the sensor data 104, such as an image sensor(s) (e.g., a camera(s)) that generates image data, a RADAR sensor(s) that generates RADAR data, a LiDAR sensor(s) that generates LiDAR data, and/or any other type of sensor that generates any other type of sensor data. In some examples, the vehicle uses the sensor(s) 102 to generate the sensor data 104 while navigating around an environment. In some examples, the vehicle may include one or more components and/or systems that process the sensor data 104.

The process 100 may include a perception component 106 that processes the sensor data 104 in order to determine information associated with objects located within the environment. For instance, the perception component 106 may include functionality to perform object detection, segmentation, and/or classification. For example, the perception component 106 may generate data 108 (also referred to as "perception data 108") indicating detected lanes and boundaries on driving surfaces, detected drivable free-space, detect poles or signs, detected traffic lights, detect objects in the environment (e.g., vehicles, pedestrians, animals, inanimate objects, etc.), detected wait conditions and intersections, and/or the like. In additional or alternative examples, the perception component 106 may generate data 108 that indicates one or more characteristics associated with a detected object and/or the environment in which the object is positioned. The characteristics associated with an object may include, but are not limited to, an x-position (global and/or local position), a y-position (global and/or local position), a z-position (global and/or local position), an orientation (e.g., a roll, pitch, yaw), an object classification (e.g., a type of object), an object state (e.g., static or dynamic), a velocity, an acceleration, a lateral and/or longitudinal extent (size), and/or any other information associated with the object.

In those examples in which the perception component 106 performs detection, the perception component 106 may generate data 108 that indicates detections of objects detected in an image. Such detections may comprise two-dimensional (2D) and/or three-dimensional (3D) bounding shapes and/or masks of detected objects. Additionally, in some examples, the data 108 may indicate one or more probabilities and/or confidences associated with an object, such as a probability associated with the location of the object, a probability associated with the classification of the object, a confidence associated with the velocity of the object, and/or the like. In some examples, the perception component 106 may use a machine learning approach (e.g., scale-invariant feature transform (SIFT), histogram of oriented gradients (HOG), etc.) followed by a support vector machine (SVM) to classify objects depicted in images represented by the sensor data 104. Additionally, or alternatively, in some examples, the perception component 106 may use a deep learning approach based on a convolutional neural network (CNN) to classify objects depicted in images represented by the sensor data 104. While these are just a couple example approaches that may be used by the perception component 106, in other examples, the perception component 106 may use additional and/or alternative approaches to classify objects depicted in images.

The process 100 may include a lane component 110 that is configured to analyze the sensor data 104, the perception data 108, and/or map data 112 representative of an environment in order to detect lanes and/or detect static objects located within the lanes. For example, the lane component

110 may use the map data 112 (e.g., from a high-definition (HD) map) to determine lane locations and/or classifications in two-dimensional (2D) image space and/or three-dimensional (3D) world space. As another example, and additionally or alternatively to using the map data 112, the lane component 110 may use the perception data 108 to generate lane representations, where the perception data 108 is indicative of lane locations and/or classifications. For example, using the map data 112 and/or the perception data 108, the lane representations may correspond to locations of one or more lanes—e.g., a vehicle's lane (e.g., a lane that the vehicle is currently navigating within), a lane(s) right of the vehicle, a lane(s) left of the vehicle, and so on. As such, the classifications may correspond to whether the lane is a vehicle's lane or another lane relative to the vehicle. In some examples, the classifications may be irrespective of the vehicle, and thus may include classifiers such as furthest right lane, furthest left lane, etc., or may include identifiers such as lane 1, lane 2, lane 3, etc. One or more lanes (e.g., each lane) may be represented using lane edges (e.g., a right edge and a left edge) and/or a centerline or rail.

The lane component 110 may identify the edges and/or the centerline using the perception data 108 and/or the map data 112. In some instances, such as where the perception data 108 indicates the edges, or the map data 112 includes only the edges, the lane component 110 may determine the centerline using the edges—e.g., by generating the centerline at a middle point between the edges. In some examples, the lane component 110 may represent the detected one or more lanes using a lane graph that is generated using, for example and without limitation, fusion (e.g., MapPerceptionFusion) of a plurality of outputs. For example, the fusion may be between the map data 112 and the perception data 108 (and/or the sensor data 104). As another example, the fusion may be between the perception data 108 (and/or the sensor data 104) generated using multiple sensor modalities (e.g., LiDAR sensors, RADAR sensors, image sensors, etc.) and/or the map data 112. As such, the lane representations (e.g., lane graph) may be generated using one or more sources of data. Where multiple data sources are fused, the accuracy or precision of the resulting lane representations may increase.

In some examples, the lane component 110 may generate an indication of locations of one or more dividers (e.g., lane edges, lane lines, etc.), and the centerline may be determined for the lane using the one or more dividers. In some instances, the lane dividers may include multiple predictions per lane edge or line. In such examples, the lane component 110 may determine the final lane lines using a geometric average of inner edges of the lane dividers. These final lane lines may then be used by the lane component 110 to determine the centerline (e.g., half the distance between the two edges or dividers of the lane). The lanes may be represented, in examples, using polylines—e.g., a first polyline for a first edge or divider, a second polyline for a second edge or divider, and/or a third polyline for a centerline (e.g., proposed driving line). In some examples, the polylines may be represented using directed acyclic graphs (DAGs) consisting of a set of nodes and directed edges between the nodes.

In some examples, the lane component 110 may further be configured to determine whether one or more objects, such as one or more static objects, are located within the vehicle's lane. For instance, the lane component 110 may use the perception data 108 and/or the map data 112 to determine a location(s) of an object(s) within the vehicle's lane, a distance(s) to object(s), a classification(s) associated with the object(s), a state(s) associated with the object(s) (e.g., that the object(s) is a static object(s)), and/or any other information associated with the object(s). The lane component 110 may then output data 114 (also referred to as "lane data 114") representing information associated with the vehicle's lane (e.g., the edges of the lane, the centerlines of the lane, the geometry of the lane, etc.) and the information associated with the static object(s).

The process 100 may include a planning component 116 that is configured to determine paths for the vehicle. For instance, the planning component 116 may process at least the perception data 106, the map data 112, and/or the lane data 114 to generate an initial path for the vehicle within the vehicle's lane. In some examples, the planning component 116 may determine the initial path using a current location of the vehicle, one or more prior locations of the vehicle, an orientation of the vehicle, a speed, velocity, or acceleration of the vehicle, locations, poses, speeds, velocities, and/or accelerations of dynamic object in the environment, freespace information, and/or other information. As described herein, the path for the vehicle may include a lane of travel for the vehicle.

In some examples, to determine the initial path through the lane, the planning component 116 may use a geometry of the lane as represented by the lane data 114. As described herein, the geometry may include a boundary line on both sides of the lane, and a centerline (or rail) of the lane (e.g., generally in the middle of the two boundary lines). In some examples, the planning component 116 may determine the initial path of the vehicle within a lane using the centerline or rail of the lane that corresponds to the initial path. In this way, a centerline of the vehicle may be aligned with the centerline of the lane to allow the vehicle to traverse the lane in the middle of the lane.

As such, in some examples, the planning component 116 may determine the initial path of the vehicle such that a longitudinal centerline of the vehicle substantially aligns with the centerline of the vehicle's lane. However, in some instances, the vehicle's lane may have one or more static objects (e.g., parked vehicles, storage containers, trash cans, etc.) occupying at least a portion of the vehicle's lane. This may occur in various environments. For a first example, this may occur in a residential environment where a lane may be wide enough for moving vehicles to traverse as well as for vehicles to safely park to the side. For a second example, this may occur at a park or other venue, where the venue allows for parking along, e.g., a curb of the park, while the remainder of the lane is available for vehicles to traverse within close proximity to the parked vehicles. In examples where the vehicle is to traverse a lane that includes a static obstacle occupying at least a portion of the lane, the vehicle may end up in a state where the static object(s) is in the path or unnecessarily close to the path of the vehicle.

As such, the process 100 may include a path component 118 that is configured to determine a new path for the vehicle to traverse within environment (e.g., within the lane, or potentially partially entering an adjacent lane if required for traversing through the environment around the object(s)). In some examples, the path component 118 may be activated and/or deactivated based on one or more events occurring. For a first example, the path component 118 may be activated based on the lane component 110 and/or the planning component 116 detecting one or more static objects within the vehicle's lane (and/or within a threshold distance to the vehicle) and/or detecting that the one or more static objects are located along and/or within a threshold distance to the initial path. For a second example, the path component 118 may be activated when the vehicle is navigating along a first type(s) of environment(s), such as a rural environment, a metropolitan environment, a suburban environment, and/or the like, and deactivated when the vehicle is navigating along a second type(s) of environment(s), such as a highway environment, an interstate environment, through an intersection, and/or the like. For a third example, the path component 118 may be activated when the vehicle is traveling at first velocities, such as first velocities that are less than a threshold velocity, and deactivated when the vehicle is traveling at second velocities, such as second velocities that are equal to or greater than the threshold velocity. While these are just a couple example events that may cause the path component 118 to be activated and/or deactivated, in other examples, the path component 118 may be activated and/or deactivated based on the occurrence of one or more additional and/or alternative events.

The path component 118 may use the map data 112, the lane data 114, and/or path data 120, which may represent the initial path of the vehicle, to determine a new path for the vehicle. For instance, once the static object(s) is identified, the path component 118 may use the presence (e.g., location, size, pose, etc.) of the static object(s) within the lane to determine and/or update one or more of the lines, edges, centerlines, or other lane or path representations used to represent the lane or path. To determine the size of a static object—or at least the lateral width or extent—various approaches may be used. For a first example, the path component 118 may estimate the width using the classification information and a corresponding estimated width. In such an example, if the class of the static object is a sedan, the width may be estimated as five feet, and if the class of the static object is a trash can, the width may be estimated as two and a half feet. As such, based on the detected location of the object, and a detected centerline/point, the width may be used to determine the extent that the object protrudes into the vehicle's lane.

For a second example, the path component 118 may use a detection of the static object to determine the size of the object. For instance, if detected in 2D image space using a bounding shape, the bounding shape may be projected to 3D world space, and a width of the bounding shape in 3D world space may be used to determine the width of the object. For a third example, the path component 118 may use a number of pixels of width of the bounding shape and an estimated distance (e.g., in world space) to determine the size—e.g., using a lookup table, or a conversion function. As a further example, the path component 118 may use a 3D bounding shape (e.g., a cuboid) computed for an object(s)—e.g., using one or more neural networks. In any of these examples, the path component 118 may determine the width or extent of the object(s) extending into the vehicle's lane (e.g., perpendicular to a direction of travel along the vehicle's lane), and then use that in the adjustment of the lane representation(s).

In some examples, to ensure a safe distance from each object or obstacle, the path component 118 may inflate the determined width by either a scalar factor or a known offset. This may be performed, e.g., using equation (1) or (2), below:

$$W'_{obs} = \lambda * W_{obs} \text{ where } \lambda > 1.0 \tag{1}$$

$$W'_{obs} = (W_{obs} + \theta_0) \text{ where } \theta_0 \text{ is const} \tag{2}$$

Once the size of the static object(s) is determined, the path component 118 may determine and/or update lane representations (e.g., lines or edges or dividers, centerlines, edges associated with a static object(s), etc.) to account for the static object(s). For example, the path component 118 may determine a first edge (e.g., a right edge) of the vehicle's lane corresponding to a road boundary, a second edge (e.g., a left edge) of the vehicle's lane corresponding to another road boundary, a third edge (e.g., an updated right edge) corresponding to a left side(s) of a static object(s) located proximate to the first edge, a fourth edge (e.g., an updated left edge) corresponding to a right side(s) of a static object(s) located proximate to the second edge, and/or a fifth edge that is associated with the center of the vehicle's lane. The path component 118 may then use one or more of those edges in order to determine a new centerline of the new path (e.g., a shifted centerline from the original centerline of the original path) for the vehicle such that the vehicle avoids a collision with the static object(s) and/or maintains a greater buffer between the vehicle and the static object(s).

In some examples, the path component 118 may perform one or more techniques to determine the new centerline associated with the new path. For a first example, the path component 118 may continue to shift the initial centerline of the initial path in a direction that is away from the static object(s) (e.g., the third edge) until the shifted centerline provides the new path that avoids the collision with the static object(s) and/or creates the greater (or desired, or more than a threshold sized) buffer between the vehicle and the static object(s). In such an example, the path component 118 may shift the original centerline by given increments, such as 0.1 meters, 0.5 meters, 1 meter, 2 meters, and/or any other distance. For a second example, the path component 118 may determine the new centerline of the new path based on the side(s) of the static object(s) (e.g., the third edge or the fourth edge) and the fifth edge, such as by centering the new centerline between the side(s) of the static object(s) and the fifth edge, in order for the new path to again avoid the collision with the static object(s) and/or creates the greater buffer between the vehicle and the static object(s). While these are just a couple example techniques of how the path component 118 may determine the new centerline, in other examples, the path component 118 may use additional and/or alternative techniques to determine the new centerline.

Figure 2:
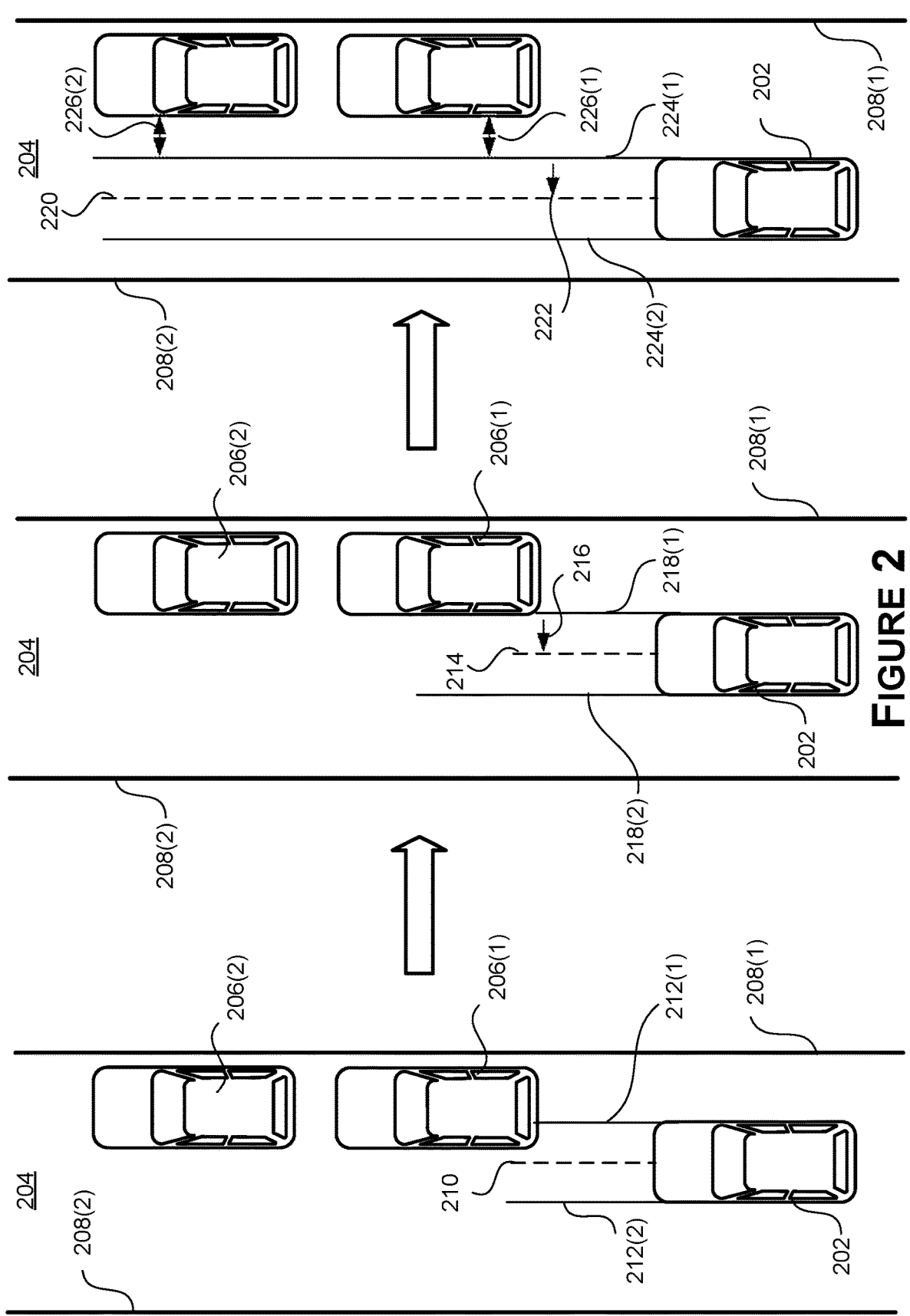
FIG. 2 illustrates a first example of determining a new path for a vehicle by shifting an initial centerline of an initial path of the vehicle, in accordance with some embodiments of the present disclosure.

FIG. 2 illustrates a first example of determining a new path for a vehicle 202 by shifting an initial centerline of an initial path of the vehicle 202, in accordance with some embodiments of the present disclosure. As shown, the vehicle 202 may be navigating along a lane 204 that includes two static objects 206(1)-(2) (also referred to singularly as "static object 206" or in plural as "static objects 206"). While navigating, the vehicle 202 may determine a first edge 208(1) of the lane 204 and a second edge 208(2) of the lane 204, where the static objects 206 are located proximate to the first edge 208(1). Additionally, the vehicle 202 may determine a first path that includes a first centerline 210, a first right edge 212(1), and a first left edge 212(2). As shown by the left illustration, if the vehicle 202 were to navigate along the first path, the vehicle 202 would collide with at least the object 206(1). As such, the vehicle 202 may perform one or more processes to determine a second path for navigating along the lane 204.

For instance, and as illustrate by the middle illustration, the vehicle 202 may determine a second centerline 214 for the second path by shifting the first centerline 210 by a first given amount, which is indicate by an arrow 216. As such, and as shown, the second path now includes the second centerline 216, a second right edge 216(1), and a second left edge 216(2). However, even with shifting to the second centerline 216, the vehicle 202 may still collide with at least the object 206(1) when navigating along the second path. As such, the vehicle 202 may again perform one or more processes to determine a third path for navigating along the lane 204.

For instance, and as illustrated by the right illustration, the vehicle 202 may determine a third centerline 220 for the third path by shifting the second centerline 214 by a second given amount, which is indicated by an arrow 222. In some examples, the second given amount is the same as the first given amount while, in other examples, the second given amount is different (e.g., less than or greater than) the first given amount. As such, and as shown, the third path now includes the third centerline 220, a third right edge 224(1), and a third left edge 224(2). The vehicle 202 may then determine to navigate along the third path based on the vehicle 202 not colliding with either of the static objects 206 while navigating along the third path.

In some examples, the vehicle 202 may perform one or more additional checks when determining to navigate along the third path. For a first example, the vehicle 202 may determine that there is a safe lateral distance between one or more (e.g., each) of the static objects 206. In some examples, the vehicle 202 may make the determination based on distances 22261)-(2) between the vehicle 202 and the static objects 206 being equal to or greater than a threshold distance (e.g., 0.5 meters, 1 meter, 2 meters, etc.). For a second example, the vehicle 202 may determine that the third path does not overlap with the second edge 208(2) of the lane. While these are just a couple additional example checks that the vehicle 202 may perform when determining to navigate the third path, in other examples, the vehicle 202 may perform additional and/or alternative checks.

In the example of FIG. 2 (as well as one or more of the other examples described herein), the vehicle 202 (e.g., the path component 118) may use free-space detection in order to determine the new paths. For instance, the vehicle 202 may use one or more components (e.g., one or more of the components described herein) to determine the free-space associated with the lane. In the example of FIG. 2, the free-space may include the area of the lane 204, such as between the first edge 208(1) an the second edge 208(2), where the static objects 206 are not located. The vehicle 202 may then only determine new paths that are located within the free-space.

Figure 3:
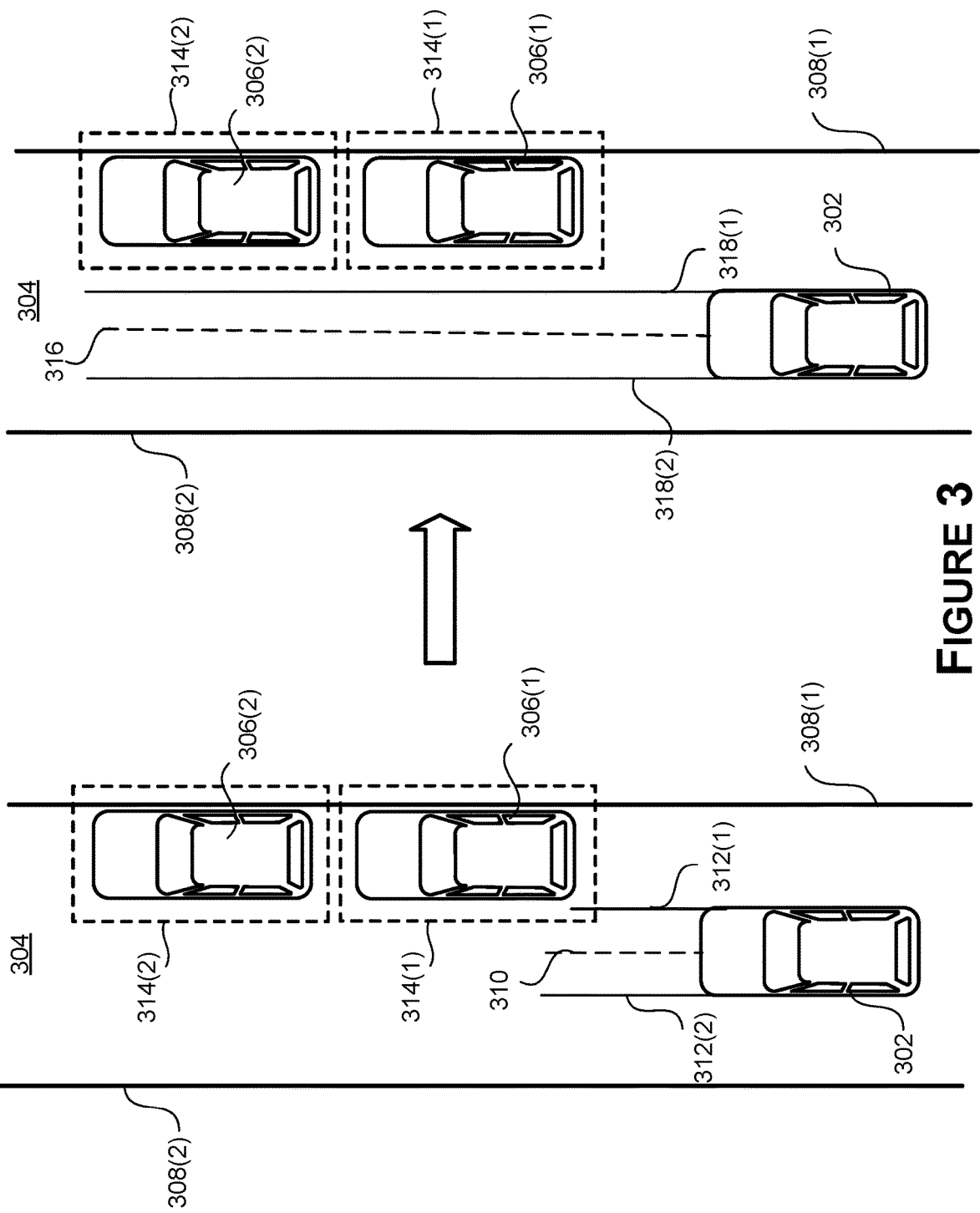
FIG. 3 illustrates a second example of determining a new path for a vehicle by shifting an initial centerline of an initial path of the vehicle, in accordance with some embodiments of the present disclosure.

FIG. 3 illustrates a second example of determining a new path for a vehicle 302 by shifting an initial centerline of an initial path of the vehicle 302, in accordance with some embodiments of the present disclosure. As shown, the vehicle 302 may be navigating along a lane 304 that includes two static objects 306(1)-(2) (also referred to singularly as "static object 306" or in plural as "static objects 306"). While navigating, the vehicle 302 may determine a first edge 308(1) of the lane 304 and a second edge 308(2) of the lane 304, where the static objects 306 are located proximate to the first edge 308(1). Additionally, the vehicle 302 may determine a first path that includes a first centerline 310, a first right edge 312(1), and a first left edge 312(2).

As described herein, to ensure a safe distance from each static object 306, the vehicle 302 may inflate the determined width by either a scalar factor or a known offset. As such, and as shown by the left illustration, the vehicle 302 may determine at least a bonding shape 314(1) associated with the static object 306(1) and a bounding shape 314(2) associated with the static object 306(2). The vehicle 302 may then determine that, if the vehicle 302 were to navigate along the first path, the vehicle 302 would intersect with at least the bounding shape 314(1) associated with the static object 306(1) even though the vehicle 302 may not collide with the static object 306(1). As such, the vehicle 302 may perform one or more processes to determine a second path for navigating along the lane 304.

For instance, and as illustrated by the right illustration, the vehicle 302 may determine a second centerline 316 for the second path by shifting the first centerline 310 by a given amount. As such, and as shown, the second path now includes the second centerline 316, a second right edge 318(1), and a second left edge 318(2). The vehicle 302 may then determine to navigate along the third path based at least on the vehicle 302 not intersecting with the bounding shape 314(1) and/or the bounding shape 314(2). Additionally, in some examples, and similar to the example of FIG. 2, the vehicle 302 may perform one or more additional and/or alternative checks when determining to navigate along the second path.

Figure 4:
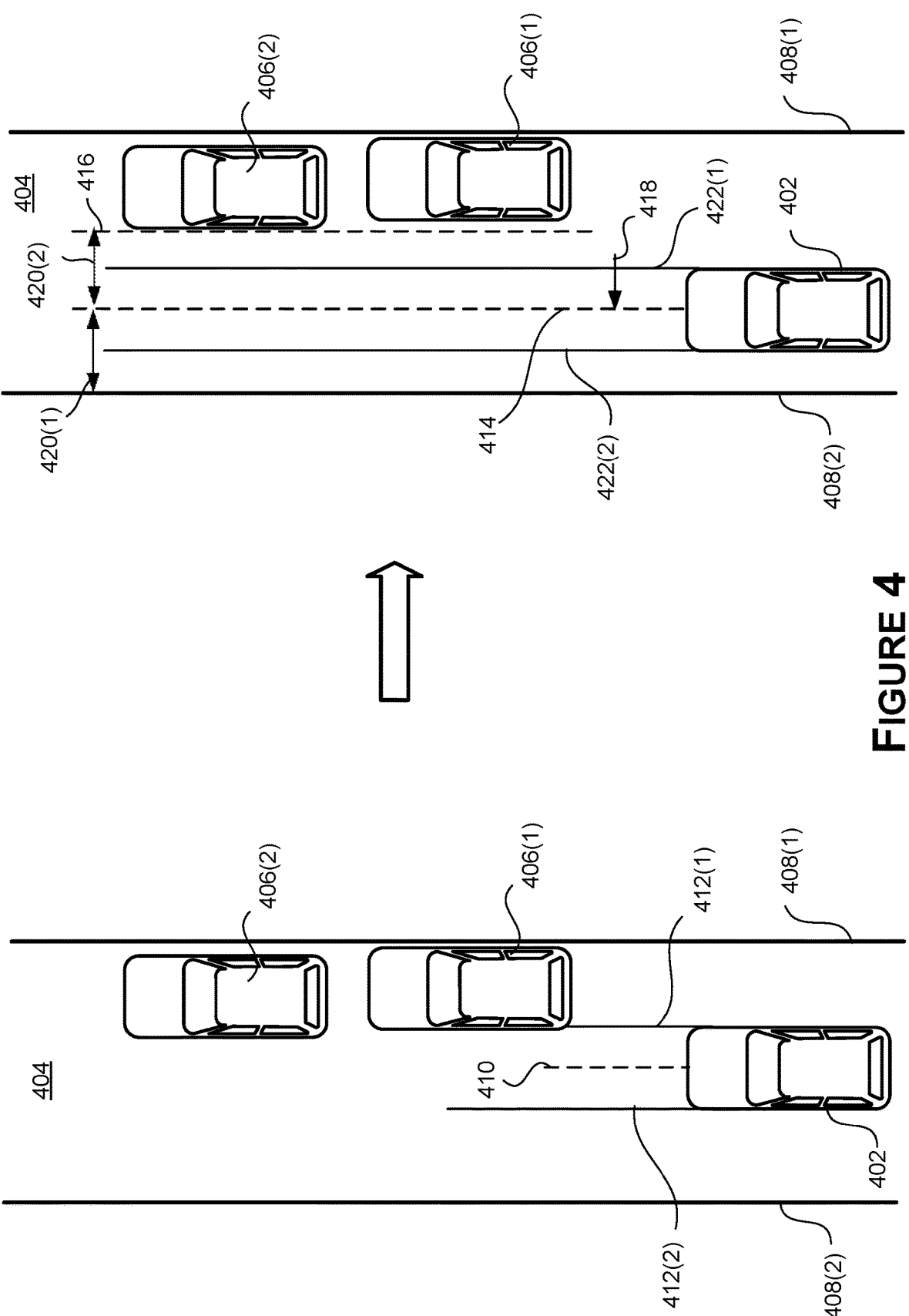
FIG. 4 illustrates a first example of determining a new path for a vehicle using edges associated with a lane and static objects, in accordance with some embodiments of the present disclosure.

FIG. 4 illustrates a first example of determining a new path for a vehicle 402 using edges associated with a lane 404, in accordance with some embodiments of the present disclosure. As shown, the vehicle 402 may be navigating along the lane 404 that includes two static objects 406(1)-(2) (also referred to singularly as "static object 406" or in plural as "static objects 406"). While navigating, the vehicle 402 may determine a first edge 408(1) of the lane 404 and a second edge 408(2) of the lane 404, where the static objects 406 are located proximate to the first edge 408(1). Additionally, the vehicle 402 may determine a first path that includes a first centerline 410, a first right edge 412(1), and a first left edge 412(2). As shown by the left illustration, if the vehicle 402 were to navigate along the first path, the vehicle 402 would collide with at least the static object 406(1). As such, the vehicle 402 may perform one or more processes to determine a second path for navigating along the lane 404.

For instance, and as illustrated by the right illustration, the vehicle 402 may determine a second centerline 414 for the second path using at least the second edge 408(2) of the lane 404 and an edge 416 associated with the static objects 406. As shown, the edge 416 may correspond to the furthest point of the static objects 406 within the lane 404. While the example of FIG. 4 illustrates the vehicle 402 using the sides of the static objects 406 to determine the edge 416, in other examples, the vehicle 402 may initially generate bounding shapes around the static objects 406 (e.g., similar to the example of FIG. 3) and then use the sides of the bounding shapes to determine the edge 416.

In the example of FIG. 4, the vehicle 402 may determine a distance to shift the first centerline 410, which is indicated by an arrow 418, using the center between the second edge 408(2) and the edge 416, where the center is indicated such that a distance 420(1) between the second edge 408(2) and the center is equal to a distance 420(2) between the center and the edge 416. The vehicle 402 may then determine the second centerline 414 by shifting the first centerline 410 by the distance. Additionally, the vehicle 402 may determine the second path as including the second centerline 414, a second right edge 422(1), and a second left edge 422(2). In the example of FIG. 4, the vehicle 402 may then determine to navigate along the second path based on the vehicle 402 not colliding with either of the static objects 406 while navigating along the second path. Additionally, in some examples, and similar to the example of FIG. 2, the vehicle 402 may perform one or more additional and/or alternative checks when determining to navigate along the second path.

In the example of FIG. 4 (as well as any of the other examples described herein), the vehicle 402 may determine the edge 416 associated with the static objects 406 using a side of a static object 406 that is located the greatest distance into the lane 404. For instance, and as shown by the example of FIG. 4, even though the vehicle 402 approaches the static object 406(1) before approaching the static object 406(2), the vehicle 402 determines the edge 416 based on the side of the static object 406(2) since the static object 406(2) is located further into the lane 406 than the static object 406(1). In some examples, when performing such processes, the vehicle 402 may use the static object(s) that is within a threshold distance to the vehicle 402, such as ten meters, fifty meters, one hundred meters, five hundred meters, and/or any other distance.

Figure 5:
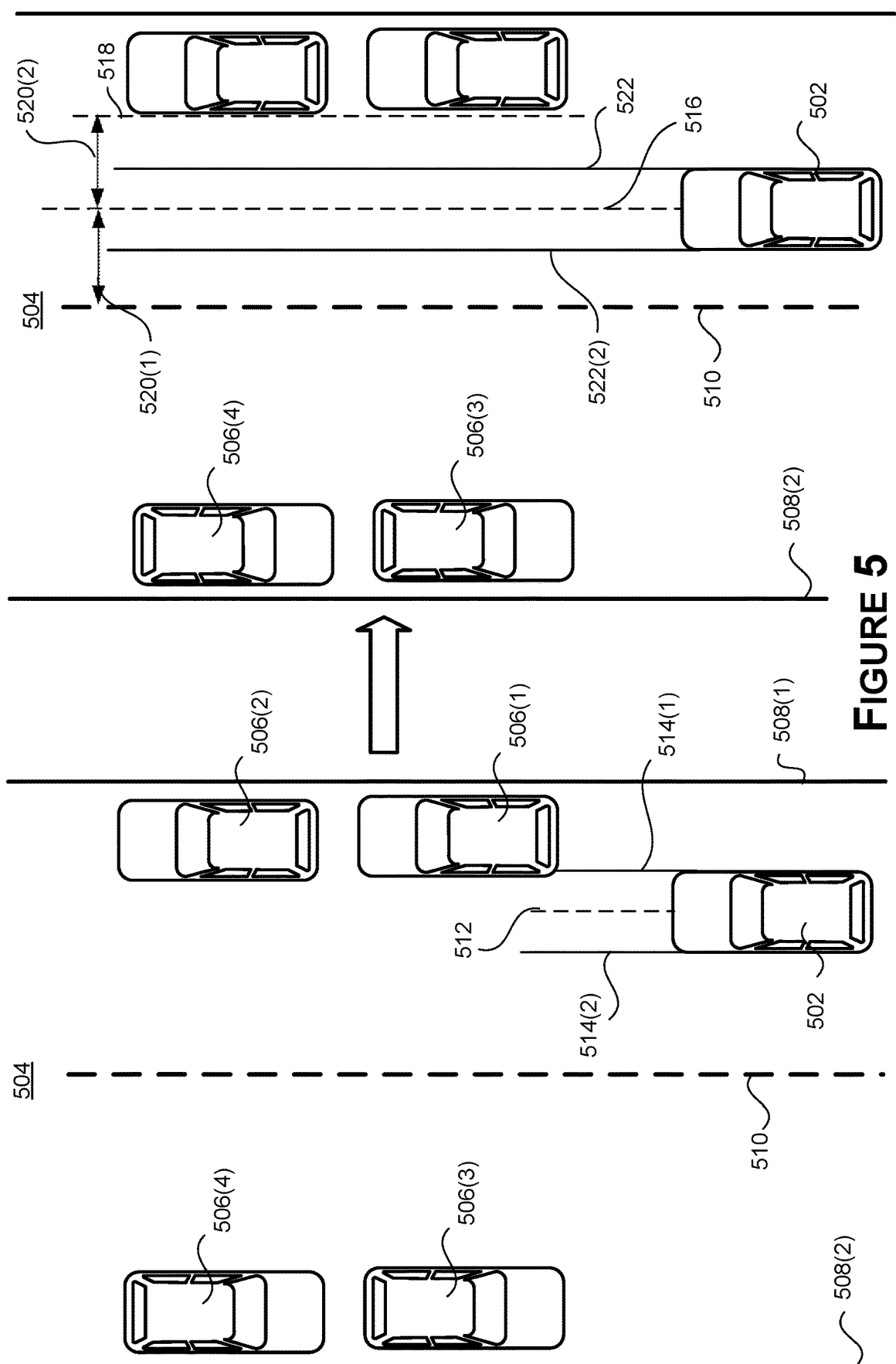
FIG. 5 illustrates a second example of determining a new path for a vehicle using edges associated with a lane and static objects, in accordance with some embodiments of the present disclosure.

FIG. 5 illustrates a second example of determining a new path for a vehicle 502 using edges associated with a lane 504, in accordance with some embodiments of the present disclosure. As shown, the vehicle 502 may be navigating along the lane 504 that includes four static objects 506(1)-(4) (also referred to singularly as "static object 506" or in plural as "static objects 506"). While navigating, the vehicle 502 may determine a first edge 508(1) of the lane 504 and a second edge 508(2) of the lane 504, where the static objects 506(1)-(2) are located proximate to the first edge 508(1) and the static objects 506(3)-(4) are located proximate to the second edge 508(2).

The vehicle 502 may also determine a center 510 of the lane 504 since the lane 504 may allow for traffic to move in two directions (e.g., the lane 504 may be broken into a first lane and a second lane). In some examples, the vehicle 502 may determine the center 510 based on the lane 504 including lane markings while, in other examples, the vehicle 502 may determine the center 510 based on the edges 508(1)-(2) (e.g., the center 510 being equal distances from the edges 508(1)-(2). Additionally, as shown by the left illustration, the vehicle 502 may determine a first path that includes a first centerline 512, a first right edge 514(1), and a first left edge 514(2). As shown, if the vehicle 502 were to navigate along the first path, the vehicle 502 would collide with at least the static object 506(1). As such, the vehicle 502 may perform one or more processes to determine a second path for navigating along the lane 504.

For instance, and as illustrated by the right illustration, the vehicle 502 may determine a second centerline 516 for the second path using at least the center 510 of the lane 504 and an edge 518 associated with the static objects 506(1)-(2). As shown, the edge 518 may correspond to the furthest point of the static objects 506(1)-(2) within the lane 504. While the example of FIG. 5 illustrates the vehicle 502 using the sides of the static objects 506(1)-(2) to determine the edge 518, in other examples, the vehicle 502 may initially generate bounding shapes around the static objects 506(1)-(2) (e.g., similar to the example of FIG. 3) and then use the sides of the bounding shapes to determine the edge 518.

In the example of FIG. 5, the vehicle 502 may determine the second centerline 516 (e.g., by shifting the first centerline 512) as the center between the center 510 of the lane 504 and the edge 518, such that a distance 520(1) between the center 510 of the lane 504 and the second centerline 516 is equal to a distance 520(2) between the second centerline 516 and the edge 518. The vehicle 502 may then determine the second path as including the second centerline 516, a second right edge 522(1), and a second left edge 522(2). In the example of FIG. 5, the vehicle 502 may then determine to navigate along the second path based on the vehicle 502 not colliding with either of the static objects 506 while navigating along the second path. Additionally, in some examples, and similar to the example of FIG. 2, the vehicle 502 may perform one or more additional and/or alternative checks when determining to navigate along the second path, such as verifying that the second path does not overlap with the center 510 of the lane 504.

Figure 6:
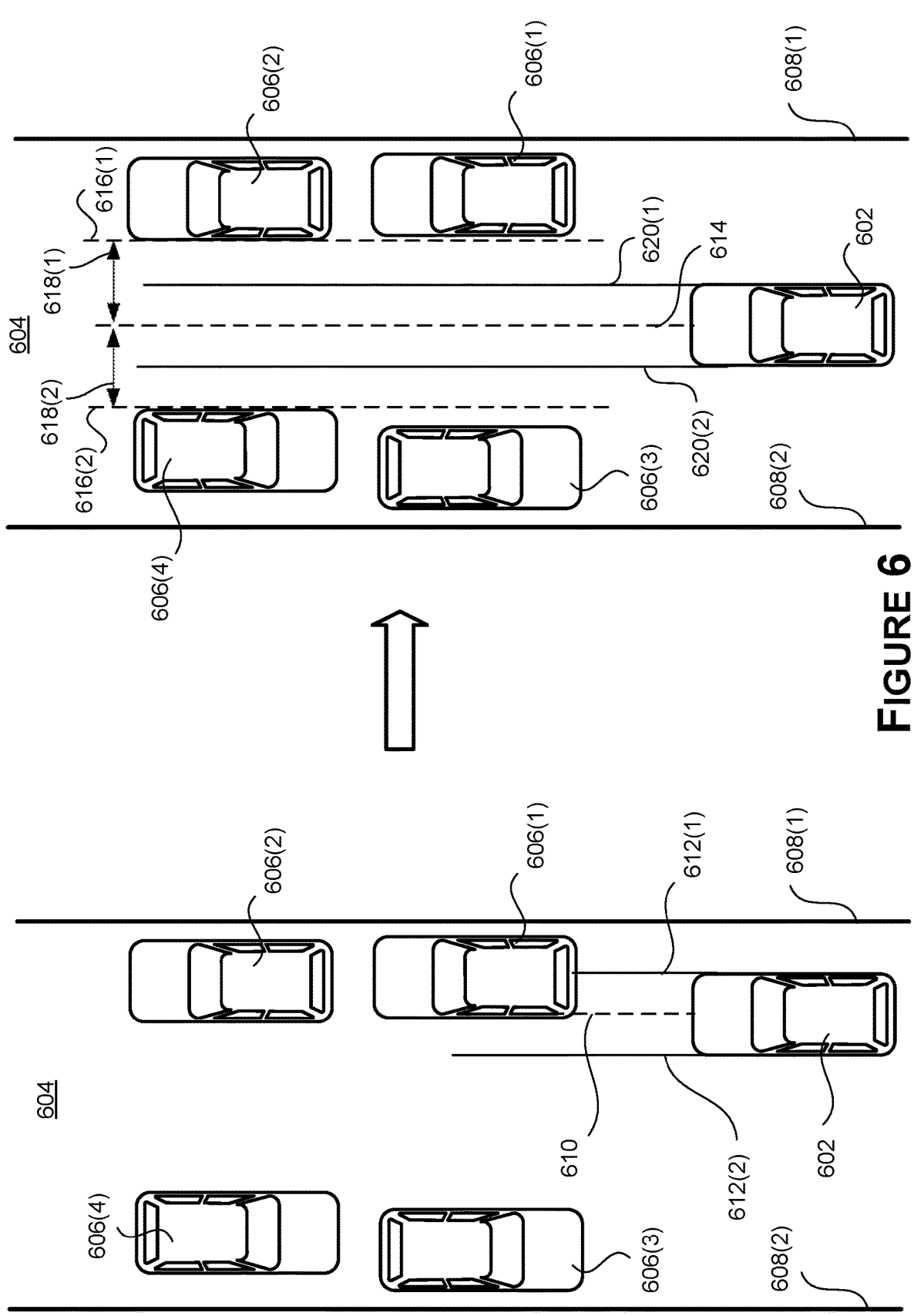
FIG. 6 illustrates a third example of determining a new path for a vehicle using edges associated with a lane and static objects, in accordance with some embodiments of the present disclosure.

FIG. 6 illustrates a third example of determining a new path for a vehicle 602 using edges associated with a lane 604, in accordance with some embodiments of the present disclosure. As shown, the vehicle 602 may be navigating along the lane 604 that includes four static objects 606(1)-(4) (also referred to singularly as "static object 606" or in plural as "static objects 606"). While navigating, the vehicle 602 may determine a first edge 608(1) of the lane 604 and a second edge 608(2) of the lane 604, where the static objects 606(1)-(2) are located proximate to the first edge 608(1) and the static objects 606(3)-(4) are located proximate to the second edge 608(2). Additionally, as shown by the left illustration, the vehicle 602 may determine a first path that includes a first centerline 610, a first right edge 612(1), and a first left edge 612(2). As shown, if the vehicle 602 were to navigate along the first path, the vehicle 602 would collide with at least the static object 506(1). As such, the vehicle 602 may perform one or more processes to determine a second path for navigating along the lane 604.

For instance, and as illustrated by the right illustration, the vehicle 602 may determine a second centerline 614 for the second path using at least an edge 616(2) associated with the static objects 606(1)-(2) and an edge 616(2) associated with the static objects 606(3)-(4). As shown, the edge 616(1) may correspond to the furthest point of the static objects 606(1)-(2) within the lane 604 and the edge 416(2) may correspond to the furthest point of the static objects 606(3)-(4) within the lane 604. While the example of FIG. 6 illustrates the vehicle 602 using the sides of the static objects 606 to determine the edges 616(1)-(2), in other examples, the vehicle 602 may initially generate bounding shapes around the static objects 606 (e.g., similar to the example of FIG. 3) and then use the sides of the bounding shapes to determine the edges 616(1)-(2).

In the example of FIG. 6, the vehicle 602 may determine the second centerline 614 as the center between the edge 616(1) and the edge 616(2), such that a distance 618(1) between the static object 606(1) and the second centerline 614 is equal to a distance 618(2) between the second centerline 614 and the edge 616(2). The vehicle 602 may then determine the second path as including the second centerline 614, a second right edge 620(1), and a second left edge 620(2). In the example of FIG. 6, the vehicle 602 may then determine to navigate along the second path based on the vehicle 602 not colliding with either of the static objects 606 while navigating along the second path. Additionally, in some examples, and similar to the example of FIG. 2, the vehicle 602 may perform one or more additional and/or alternative checks when determining to navigate along the second path.

Referring back to the example of FIG. 1, in some examples, the path component 118 may use temporal smoothing to avoid large step functions in the provided lane representation or centerline thereof. For example, if a new lane representation or centerline thereof were updated at each frame represented by the sensor data 104, or even at every five frames, the vehicle may be shifting back and forth (e.g., left to right) within the lane unnecessarily, or at a cadence that is unnatural or uncomfortable to a passenger. As such, a horizon distance (e.g., 50 meters, 100 meters, 250 meters, 500 meters, etc.) and/or horizon time (e.g., 1 second, 5 seconds, 10 seconds, etc.) may be used—e.g., the path component 118 may require a lane representation that allows the vehicle to traverse the lane safely (e.g., without collision and/or violating rules of the road) for a time horizon or distance horizon. In such an example, the path component 118 may generate a pre-smoothed lane representation or centerline thereof that extends some distance into the future and/or some distance into the future given a time window and a current velocity and/or acceleration of the vehicle. This may avoid too frequent of lateral shifts in the lane, and may provide more comfort for the passengers of the vehicle as well as less compute requirements on the system(s).

Figure 7:
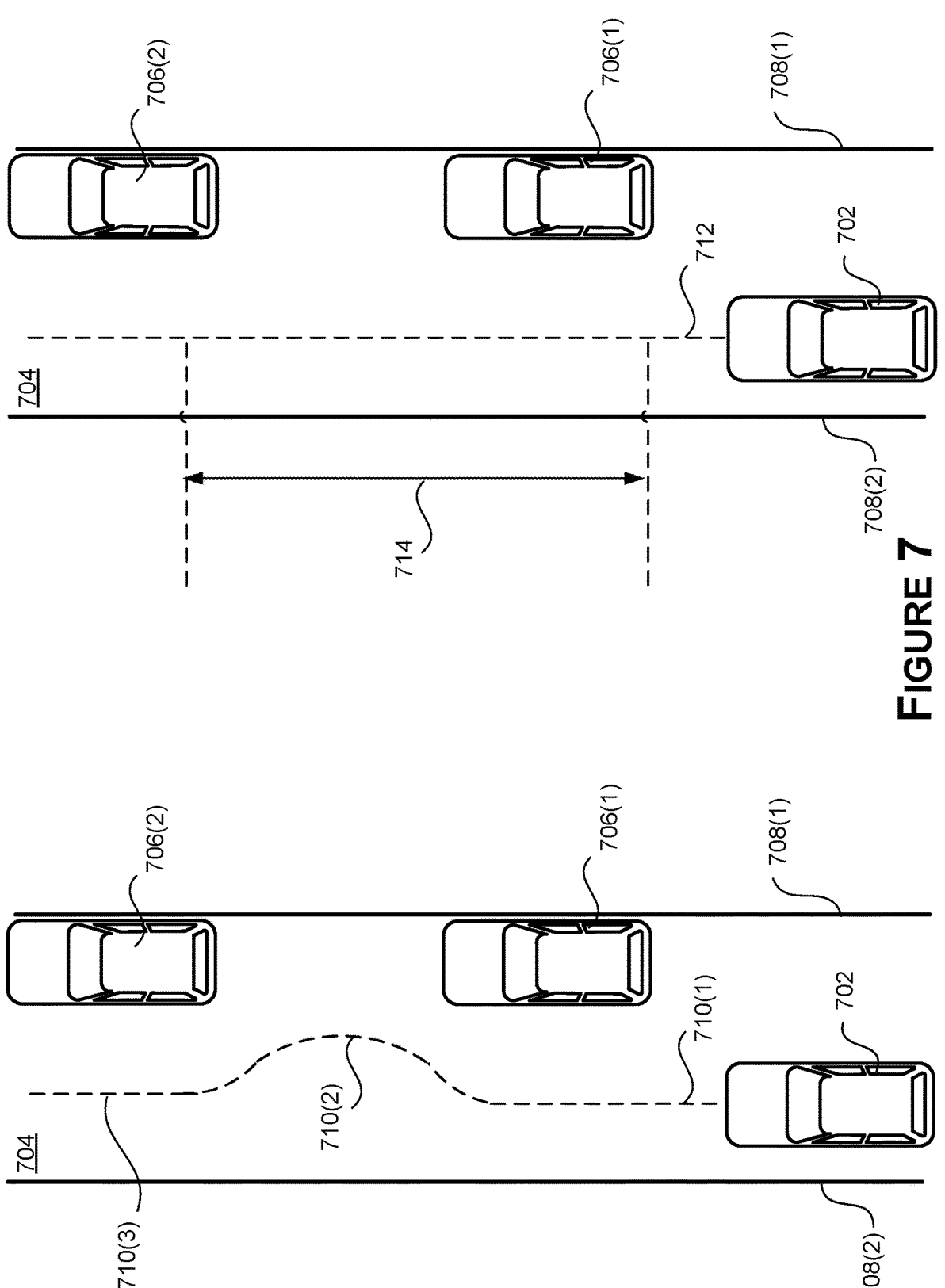
FIG. 7 illustrates an example of using smoothing when determining a new path for a vehicle, in accordance with some embodiments of the present disclosure.

For instance, FIG. 7 illustrates an example of using smoothing and/or holding a bias when determining a new path for a vehicle 702, in accordance with some embodiments of the present disclosure. As shown, the vehicle 702 may be navigating along a lane 704 that includes two static objects 706(1)-(2) (also referred to singularly as "static object 706" or in plural as "static objects 706"). While navigating, the vehicle 702 may determine a first edge 708(1) of the lane 704 and a second edge 708(2) of the lane 704, where the static objects 706 are located proximate to the first edge 708(1).

As shown by the left illustration, which does not include using smoothing and/or holding a bias, the vehicle 702 may initially determine, using one or more of the processes described herein, a path for navigating around the static objects 706. As shown, the path may include a first centerline 710(1) for navigating around the static object 706(1), a second centerline 710(2) for navigating back to the middle of the lane 704 after passing the static object 706(1), and a third centerline for navigating around the static object 706 (2). Since the vehicle 702 is not using the smoothing and/or holding the bias in the left illustration, the path for the vehicle 702 includes swerving between the static objects 706, which may by unpleasant for passengers of the vehicle 702.

As such, the right illustration indicates a path that the vehicle 702 may generate by using the smoothing and/or holding the bias. As shown, by using the smoothing and/or holding the bias, a centerline 712 of the path continues to be substantially straight even after the vehicle 702 has navigated passed the static object 706(1) and has yet to reach the static object 706(2). In some examples, the vehicle 702 performs the smoothing and/or the holding the bias using a threshold distance 714, where the threshold distance 714 extends from the beginning of the path that was determined for navigating around the static object 706(1). However, in other examples, the threshold distance 714 may start from another location and/or the vehicle 702 may use a threshold time to perform the smoothing and/or holding the bias. As shown, by performing the smoothing and/or the holding the bias, the vehicle 702 may not swerve between the static objects 706, which may be more pleasant for the passengers of the vehicle 702.

While the example of FIG. 7 describes the vehicle 702 navigating back towards a center of the lane 704 after passing the static objects 706, such after passing the static objects 706 by a threshold distance and/or after a threshold period of time passes after passing the static objects 706, in other examples, the vehicle 702 may continue to navigate closer to the second edge 708(2). For instance, and in such examples, the vehicle 702 may continue to navigate along a path that includes a centerline located between a center of the lane 704 and the second edge 708(2) since static objects, such as parked vehicles, are to park proximate to the first edge 708(1) of the lane 704. In some examples, the vehicle 702 may navigate using such a technique based on one or more characteristics associated with the lane 704, such as the lane 704 including a defined second edge 708(2) (e.g., a curb, lane markings, etc.) that the vehicle 702 is able to detect and/or the lane 704 including an approximately constant width. This way, the vehicle 702 may not need to change the location of the centerline of the path of the vehicle 702 even when static objects are located large distance (e.g., distances that area greater than the threshold distance described with respect to FIG. 7) from one another.

In some examples, the vehicle 702 may perform additional and/or alternative techniques to perform smoothing. For example, the vehicle 702 may limit the distance that the vehicle 702 is to shift the centerline of the path, such at each frame, to a threshold distance. The threshold distance may include, but is not limited to, 10 centimeters, 50 centimeters, 1 meter, and/or any other distance. By limiting the distance that the vehicle is able to shift the centerline, the vehicle 702 may not make sharp turns that pose a safety risk and/or are uncomfortable to the passengers within the vehicle 702.

Referring back to the example of FIG. 1, in some examples, the path component 118 may perform one or more additional processes when determining a new path for the vehicle. For a first example, when the vehicle approaches a static object, the path component 118 may determine which side of the static object to navigate the vehicle. For instance, the path component 118 may determine whether to generate the new path to a first side of the static object, such as a left side, or a second side of the static object, such as a right side. For a second example, and again when the vehicle approaches a static object, the path component 118 may determine whether to generate a new path for the vehicle based on a distance to the static object. For instance, the path component 118 may determine to generate the new path when a distance between the vehicle and the static object is within a threshold distance, but determine not to generate the path when a distance between the vehicle and the static object is outside of the threshold.

Figure 8:
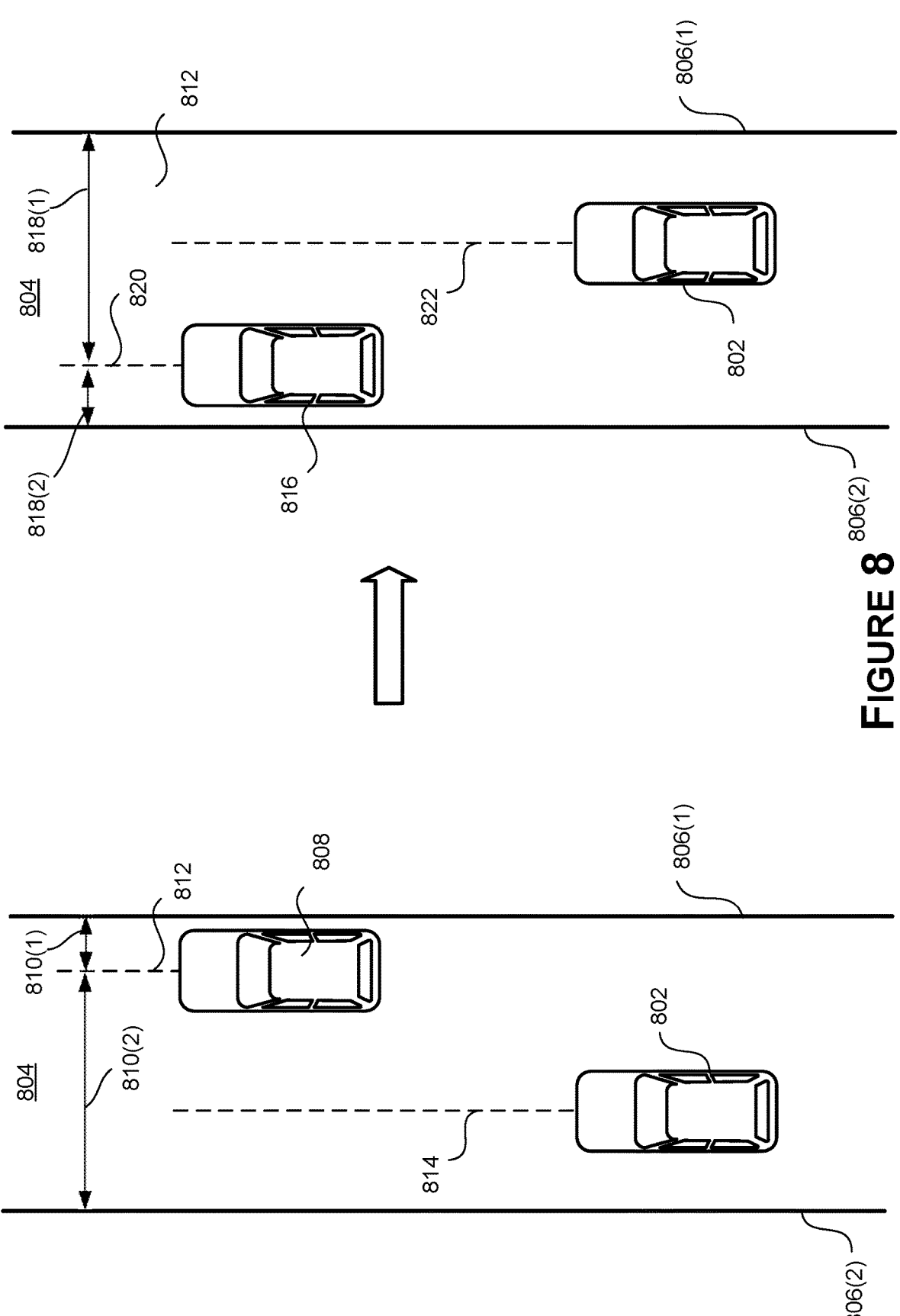
FIG. 8 illustrates an example of determining which side of a static object a vehicle should navigate when passing the static object, in accordance with some embodiments of the present disclosure.

For instance, FIG. 8 illustrates an example of determining which side of a static object to navigate a vehicle 802, in accordance with some embodiments of the present disclosure. As shown by the left illustration, the vehicle 802 may be navigating along a lane 804 that includes at least a first edge 806(1) (e.g., a right edge) and a second edge 806(2) (e.g., a left edge). While navigating, the vehicle 802 may approach a static object 808 that is located proximate to the first edge 806(1). As such, the vehicle 802 may determine a first distance 810(1) between a center 812 of the static object 808 and the first edge 806(1) and a second distance 810(2) between the center 812 of the static object 808 and the second edge 806(2). In some examples, the vehicle 802 may then determine a new path that includes a new centerline 814 that is between the static object 808 and the second edge 806(2) based on the second distance 810(2) being greater than the first distance 810(1).

In some examples, the vehicle 802 may perform one or more additional and/or alternative processes when determining to navigate around the vehicle 802. For a first example, the vehicle 802 may determine that the vehicle 802 is able to safely navigate around the static object 808 using the second distance 810(2), such as based on the second distance 810(2) satisfying (e.g., being equal to or greater than) a threshold distance. For a second example, the vehicle 802 may again determine that the vehicle 802 is able to safely navigate around the static object 808, but based on a distance between a left side of the static object 808 and the second edge 806(2) satisfying (e.g., being equal to or greater than) a threshold distance.

Next, and as shown by the right illustration, the vehicle 802 may again be navigating along the lane 804 that includes at least the first edge 806(1) (e.g., the right edge) and the second edge 806(2) (e.g., the left edge). While navigating, the vehicle 802 may approach a static object 816 that is now located proximate to the second edge 806(2). As such, the vehicle 802 may determine a first distance 818(1) between a center 820 of the static object 816 and the first edge 806(1) and a second distance 818(2) between the center 820 of the static object 808 and the second edge 806(2). In some examples, the vehicle 802 may then determine a new path that includes a new centerline 822 that is between the static object 816 and the first edge 806(1) based on the first distance 818(1) being greater than the second distance 818(2).

In some examples, the vehicle 802 may perform one or more additional and/or alternative processes when determining to navigate around the vehicle 802. For a first example, the vehicle 802 may determine that the vehicle 802 is able to safely navigate around the static object 816 using the first distance 818(1), such as based on the first distance 818(1) satisfying (e.g., being equal to or greater than) a threshold distance. For a second example, the vehicle 802 may again determine that the vehicle 802 is able to safely navigate around the static object 816, but based on a distance between a right side of the static object 816 and the first edge 80e6(1) satisfying (e.g., being equal to or greater than) a threshold distance.

Figure 9:
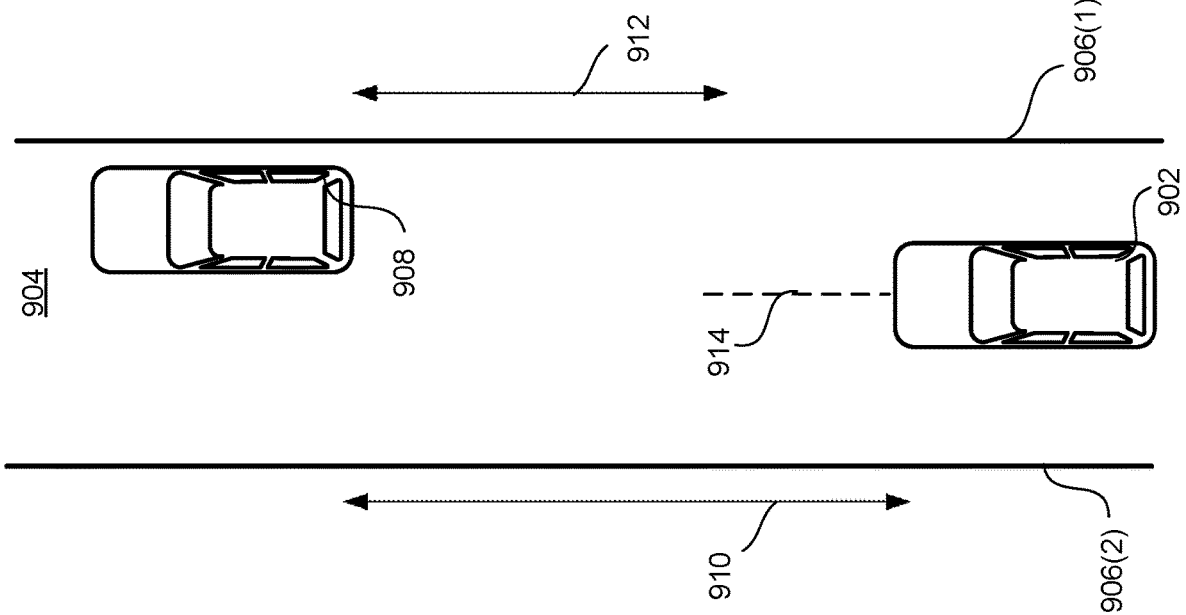
FIG. 9 illustrates an example of determining whether to generate a new path around a static object within a lane, in accordance with some embodiments of the present disclosure.

FIG. 9 illustrates and example of determining whether to generate a new path around a static object within a lane, in accordance with some embodiments of the present disclosure. As shown, a vehicle 902 may be navigating along a lane 904 that includes at least a first edge 906(1) (e.g., a right edge) and a second edge 906(2) (e.g., a left edge). While navigating, the vehicle 902 may approach a static object 908 that is located proximate to the first edge 906(1) of the lane 904. The vehicle 902 may then determine a distance 910 between the vehicle 902 and the static object 908. In some examples, the vehicle 902 may then determine that the distance 910 does not satisfy (e.g., is greater than) a distance threshold 912. As such, the vehicle 902 may determine to continue along the current path of the vehicle, 902, where the current path may include a centerline 914 associated with the lane 904.

Although the example of FIG. 9 illustrates the road 904 as being substantially straight, in some examples, the vehicle 902 may perform additional and/or alternative approaches when the road curved. For example, the vehicle 902 may truncate the distance threshold that the vehicle 902 uses based on the curvature of the road that the vehicle 902 is navigating. For instance, and in some examples, the vehicle 902 may determine the threshold distance to be associated with (e.g., include) the straightest section of the road for which the sensors of the vehicle 902 are able to represent (e.g., the furthest point of the road that may be seen).

Referring back to the example of FIG. 1, in some examples, the path component 118 may perform one or more of the processes described herein to determine multiple proposed centerlines for multiple proposed paths that the vehicle may navigate when approaching a static object(s) located within a lane. For a first example, the path component 118 may determine a first centerline for a first path by shifting the original centerline by a first distance, a second centerline for a second path by shifting the original centerline by a second distance, a third centerline for a third path by shifting the original centerline by a third distance, and/or so forth. For a second example, the path component 118 may determine multiple centerlines for multiple paths using different combinations of one or more of the edges described herein (e.g., the lane edges, the static object edges, etc.). In some examples, the path component 118 is configured to determine a threshold number of proposed centerlines, such as one centerline, five centerlines, ten centerlines, and/or any other number of centerlines. In some examples, the path component 118 may generate data associated with the proposed centerlines, such as data representing a list of the proposed centerlines.

The path component 118 may then perform one or more processes to select a proposed centerline from the proposed centerlines. For a first example, the path component 118 may select the proposed centerline with the minimal offset from the original centerline that still avoids a collision in order to minimize the amount of lateral movement of the vehicle. For a second example, the path component 118 may use one or more factors to determine scores for the proposed centerlines. The factors may include, but are not limited to, distances that proposed centerlines allow the vehicle to travel safely (e.g., without collision or violating rules of the road) within the lane (e.g., the longer the distances, the higher the scores), periods of time that the vehicle may navigate safely using the proposed centerlines (e.g., the longer the periods of time, the higher the scores), whether a collision is likely to occur, amounts of space between the vehicle and the static object(s) when navigating the proposed centerlines (e.g., the larger the amounts of space, the higher the scores), and/or any other factor. The path component 118 may then use the scores to select one of the proposed centerlines, such as by selecting the proposed centerline that is associated with the highest score from among the scores associated with the proposed centerlines.

In some examples, after determining the new path, the path component 118 may send, to at least the planning component 116, path data 122 representing the new path. The planning component 116 may then use the path data 122 to generate path data 124 representing the final path that the vehicle is to navigate. For instance, the final path may include and/or be based on the new path determined by the path component 118.

While the example of FIG. 1 illustrates the perception component 106, the lane component 110, the planning component 116, and the path component 118 as including separate components, in other examples, one or more of the perception component 106, the lane component 110, the planning component 116, and the path component 118 may be combined into one or more components. Additionally, in some examples, one or more of the perception component 106, the lane component 110, the planning component 116, and the path component 118 may be separated into one or more additional components.

Now referring to FIG. 10, each block of method 1000, described herein, comprises a computing process that may be performed using any combination of hardware, firmware, and/or software. For instance, various functions may be carried out by a processor executing instructions stored in memory. The method 1000 may also be embodied as computer-usable instructions stored on computer storage media. The method 1000 may be provided by a standalone application, a service or hosted service (standalone or in combination with another hosted service), or a plug-in to another product, to name a few. In addition, the method 1000 is described, by way of example, with respect to FIG. 1. However, the method 1000 may additionally or alternatively be executed by any one system, or any combination of systems, including, but not limited to, those described herein.

FIG. 10 is a flow diagram showing a method 1000 for using a current path of a vehicle and a location(s) of a static object(s) within a lane to determine a new path for the vehicle, in accordance with some embodiments of the present disclosure. The method 1002, at block B1002, may include determining a first edge of a lane and a second edge of the lane. For instance, the vehicle (e.g., the perception component 106, the lane component 110, etc.) may process the sensor data 104 and/or the map data 112 to determine the first edge and the second edge of the lane. In some examples, the first edge and/or the second edge may include, but are not limited to, a curb, a lane marking, a lane divider, and/or any other object that indicates the geometry of the lane.

The method 1000, at block B1004, may include determining, based at least on the first edge and the second edge, a first centerline of a first path for a vehicle along the lane. For instance, the vehicle (e.g., the planning component 116, etc.) may use the first edge and the second edge to determine the first centerline of the first path. In some examples, the vehicle may determine the first centerline as being substantially along the center of the lane between the first edge and the second edge of the lane. In some examples, the vehicle may determine the first centerline as just being located between the first edge and the second edge of the lane.

The method 1000, at block B1006, may include detecting one or more locations of one or more static objects located in the lane. For instance, such as while navigating the first path, the vehicle (e.g., the perception component 106, the lane component 110, etc.) may determine the location(s) of the static object(s). In some examples, the vehicle may use any technique to determine that the object(s) is static, such as based on the classification(s) associated with the static object(s), the location(s) of the static object(s) (e.g., the static object(s) being located proximate to the first edge or the second edge of the lane such that the static object(s) are parked), and/or the like. In some examples, the vehicle may further determine that the location(s) of the static object(s) is within a threshold distance to the vehicle.

The method 1000, at block B1008, may include determining a second centerline based at least on the first centerline and the one or more locations. For instance, the vehicle (e.g., the path component 118) may determine the second centerline of the second path. In some examples, the vehicle may determine the second centerline by shifting the first centerline, using one or more intervals, away from the location(s) of the static object(s) until the second centerline is a safe distance from the static object(s). In some examples, the vehicle may determine the second centerline based on an edge associated with the static object(s) and the edge of the lane that is located the farthest from the static object(s). For instance, the vehicle may determine a distance based on the edge associated with the static object(s) and the farthest edge and then move the first centerline by the distance.

The method 1000, at block B1010, may include determining a second path for the vehicle based at least on the second centerline. For instance, the vehicle (e.g., the path component 118) may determine the second path using the second centerline. For example, the second path may be centered around the second centerline and then include edges. The vehicle may then verify that the vehicle will not collide with the static object(s) and/or will remain at least a threshold distance from the static object(s) while navigating along the second path.

The method 1000, at block B1012, may include causing the vehicle to navigate along the second path. For instance, the vehicle may then navigate along the second path within the lane. In some examples, the vehicle may then begin navigating along a third path that includes a third centerline that is substantially similar to the first centerline, such as after the vehicle navigates around the static object(s), after the vehicle passed the static object(s) for a threshold distance, and/or after the vehicle navigates passed the static object(s) for a threshold period of time. In some examples, the vehicle may navigate a long a path that was selected based on the proposed centerline, but that is not directly along the proposed centerline. In such examples, the proposed centerline may serve as another input for determining a trajectory for the vehicle.

Example Autonomous Vehicle

Figure 11A:
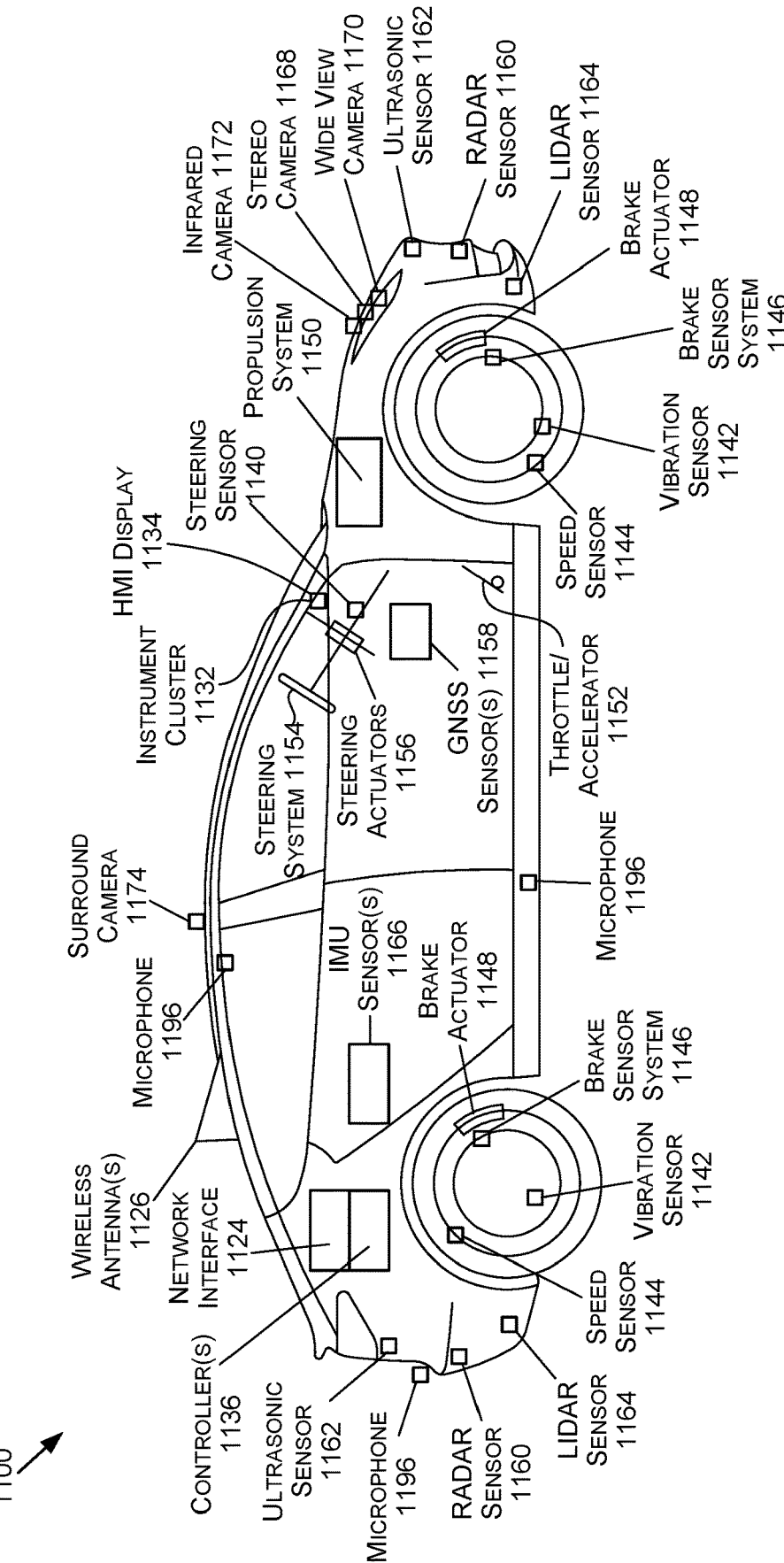
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems ("GNSS") sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the High Definition ("HD") map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 11B:
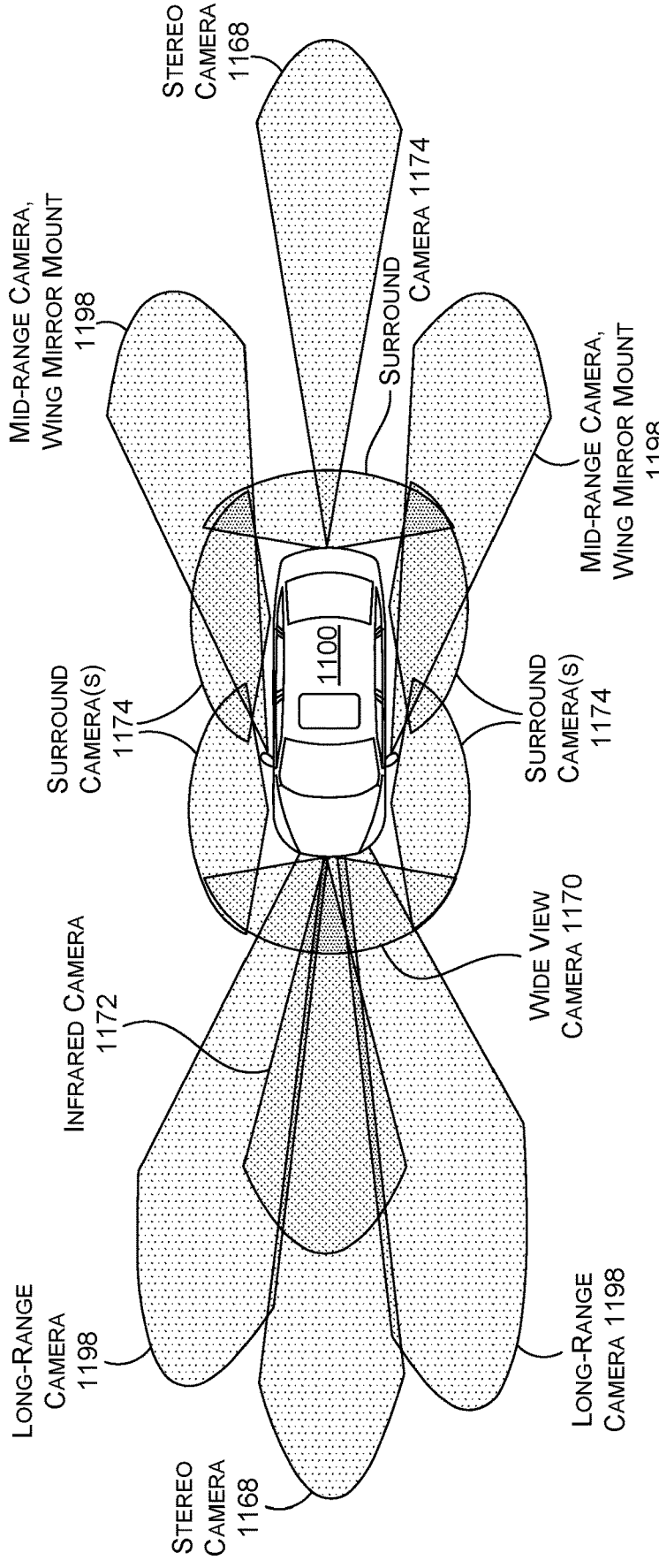
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semi-conductor ("CMOS") color imager. Another example may be a wide-view camera(s) 1170 that may be used to perceive objects coming into view from the periphery (e.g., pedes-trians, crossing traffic or bicycles). Although only one wide-view camera is illustrated in FIG. 11B, there may be any number (including zero) of wide-view cameras 1170 on the vehicle 1100. In addition, any number of long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

Any number of stereo cameras 1168 may also be included in a front-facing configuration. In at least one embodiment, one or more of stereo camera(s) 1168 may include an integrated control unit comprising a scalable processing unit, which may provide a programmable logic ("FPGA") and a multi-core micro-processor with an integrated Con-troller Area Network ("CAN") or Ethernet interface on a single chip. Such a unit may be used to generate a 3D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to acti-vate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing infor-mation used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cam-eras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occu-pancy grid. A wide variety of cameras may be used includ-ing, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
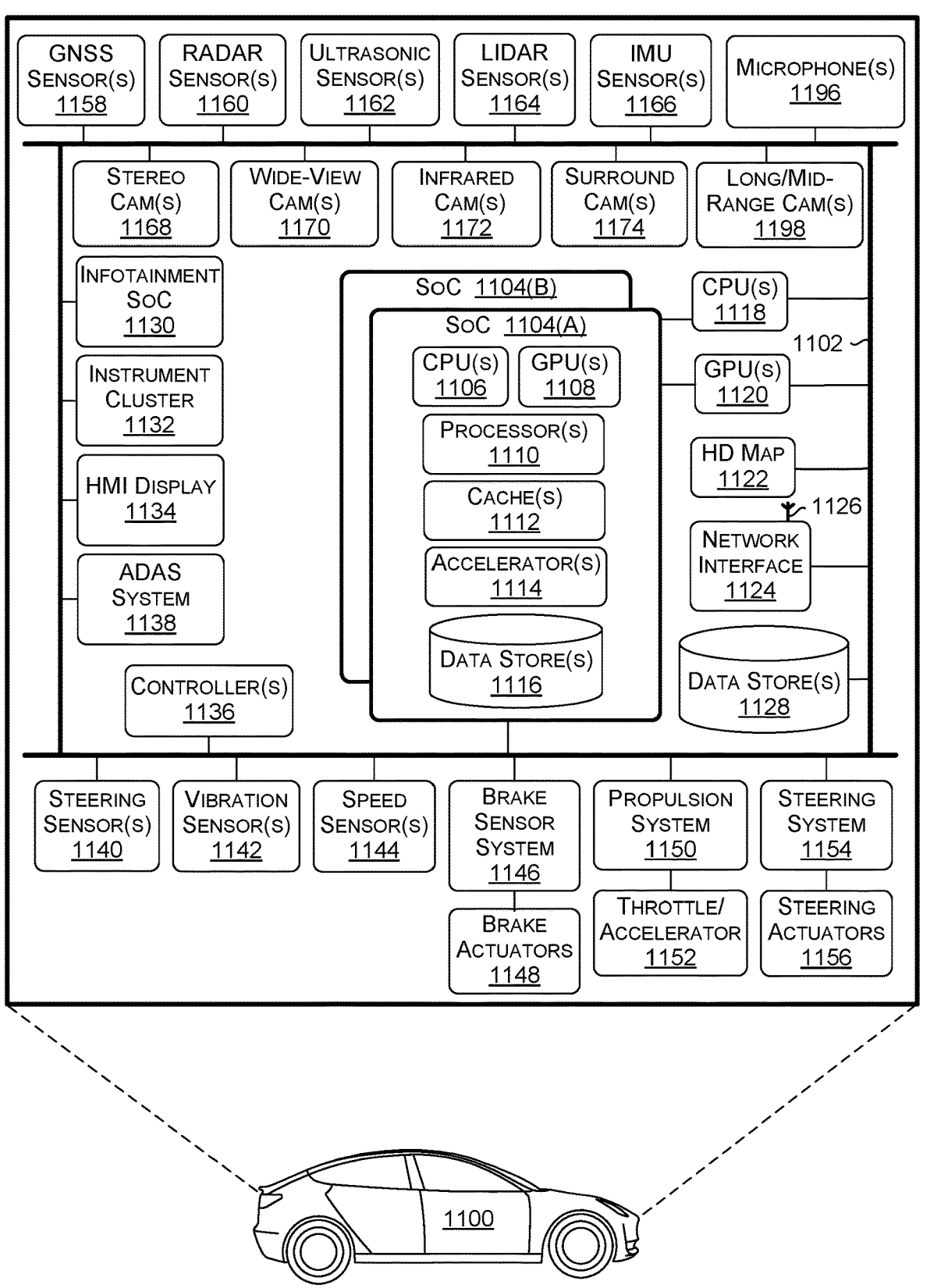
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redun-dancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example. In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera (s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
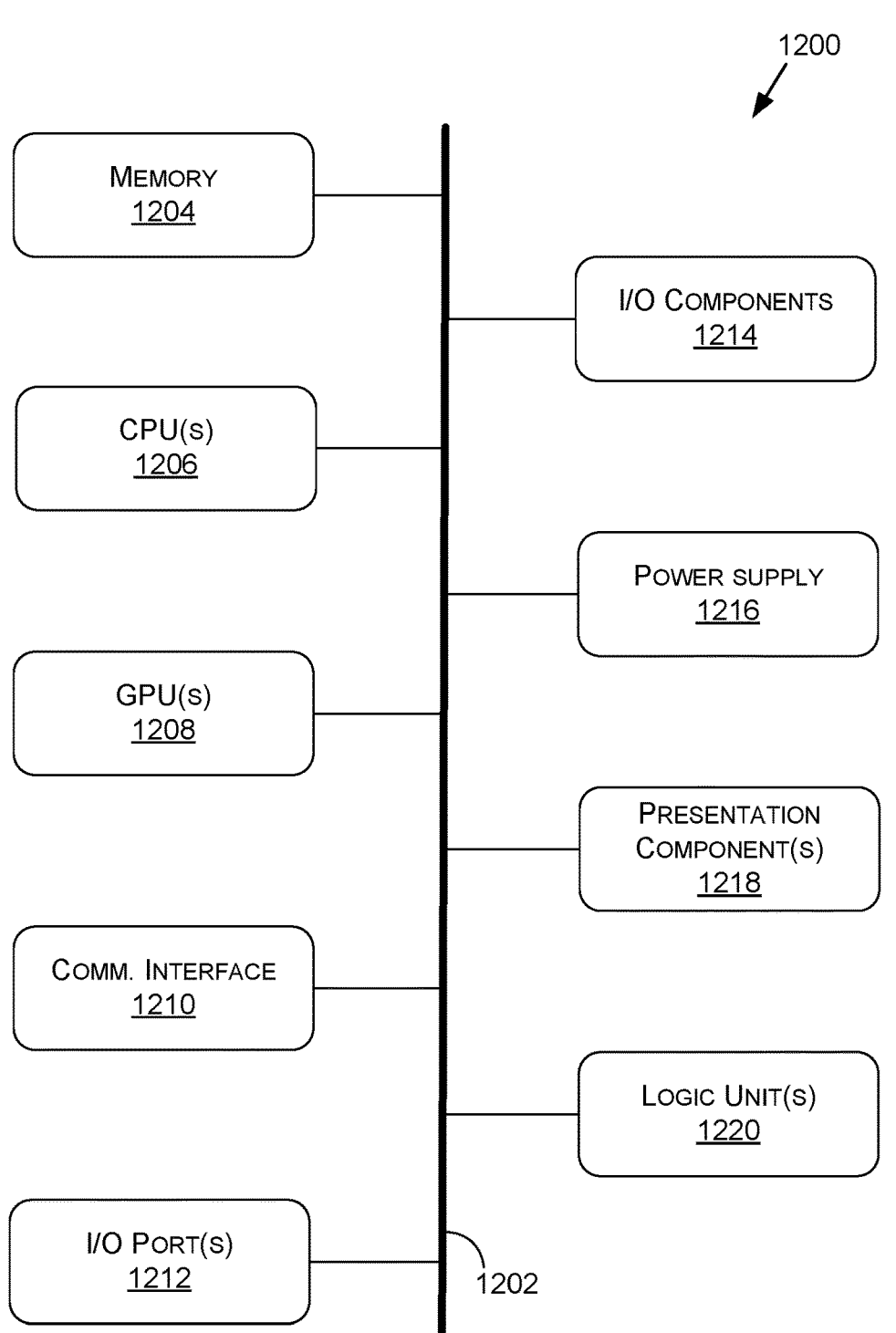
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM)

processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
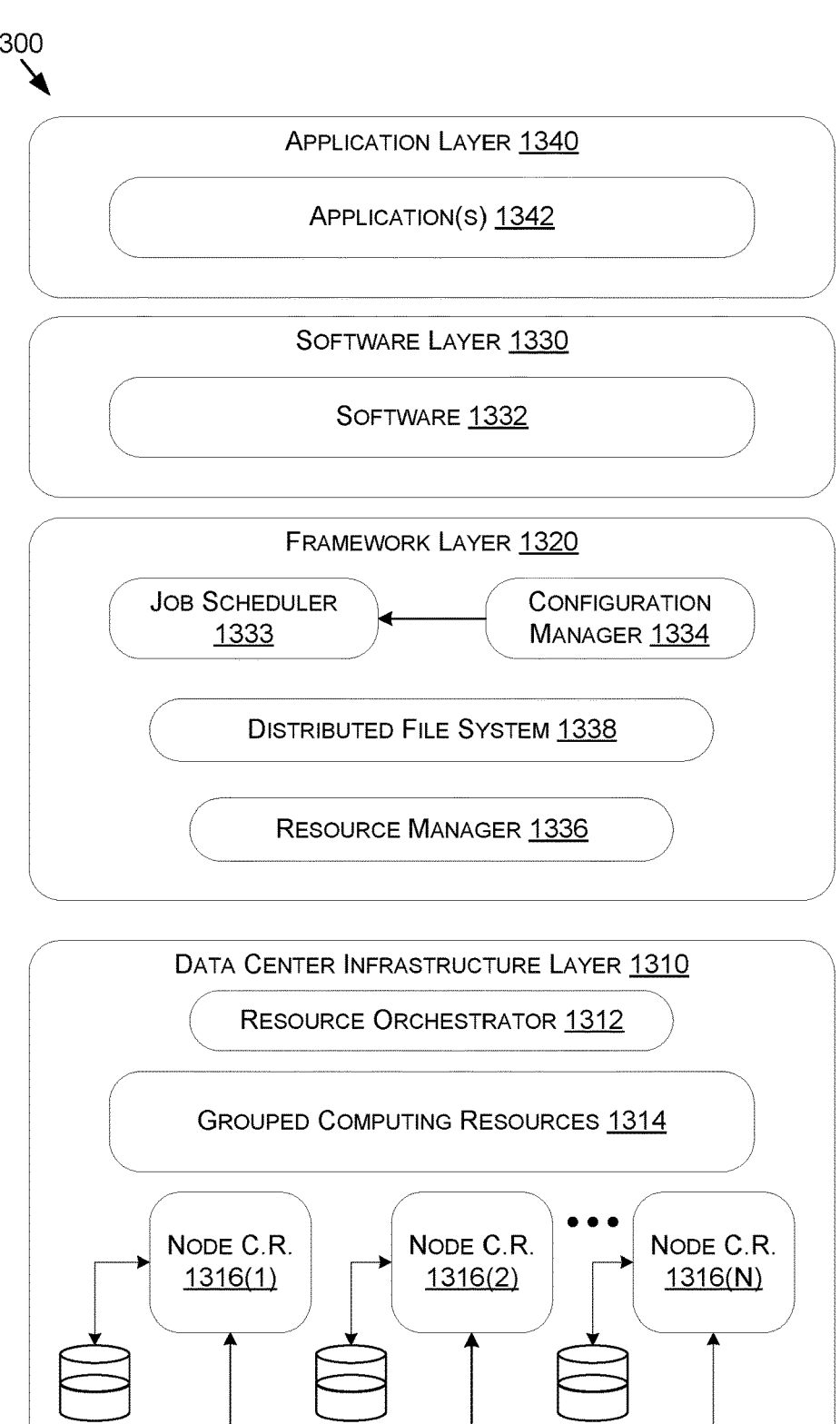
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161 (N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1333, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1333 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1333. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining a first edge of a lane of an ego-machine, a second edge of the lane, and a first centerline associated with a first path of the ego-machine, the first centerline being located approximately at a first center between the first edge and the second edge;

determining, based at least on one or more locations of one or more static objects located between the first edge of the lane and the second edge of the lane, a third edge associated with the lane;

determining a distance for shifting the first centerline based at least on the first center between the first edge and the second edge and a second center between the second edge and the third edge;

determining, based at least on shifting the first centerline in a direction that is away from the first edge and by the distance, a second centerline that is located approximately at the second center between the second edge and the third edge;

determining, based at least on the second centerline, a second path of the ego-machine; and causing the ego-machine to navigate based at least on the second path.

2. The method of claim 1, further comprising:

determining that there is a possibility of collision between the ego-machine and the one or more static objects if the ego-machine navigates along the second path;

determining a third centerline, at least, by shifting the second centerline by a second distance in the direction;

determining, based at least on the third centerline, a third path of the ego-machine; and determining that there is a lower possibility of collision between the ego-machine and the one or more static objects if the ego-machine navigates along the third path, wherein the causing the ego-machine to navigate comprises causing the ego-machine to navigate along the third path.

3. The method of claim 1, wherein:

the one or more static objects are closer to the first edge of the lane as compared to the second edge of the lane; and the determining the third edge is from the first edge and based at least on the one or more locations of the one or more static objects.

4. The method of claim 3, wherein the determining the distance comprises:

determining a second distance between the second edge and the third edge;

determining, based at least on the second distance, the second center between the second edge and the third edge; and determining the distance between the first center and the second center.

5. The method of claim 1, further comprising:

determining, based at least on the one or more locations of the one or more static objects, one or more first areas of the lane that the one or more static objects occupy; and determining, based at least on increasing the one or more first areas, one or more second areas of the lane that are associated with the one or more static objects, wherein the determining the third edge is based at least on the one or more second areas.

6. The method of claim 1, wherein the second path is associated with at least one of a threshold distance that the ego-machine is to navigate past the one or more static objects or a threshold period of time that the ego-machine is to navigate after passing the one or more static objects.

7. The method of claim 1, further comprising:

determining at least one of the lane is associated with a first type of lane or the lane is not associated with a second type of lane, wherein the determining the second centerline occurs based at least on the at least one of the lane being associated with the first type of lane or the lane not being associated with the second type of lane.

8. The method of claim 1, further comprising:

determining at least one of the one or more static objects are located along the first path of the ego-machine or the one or more locations of the one or more static objects are within a threshold distance to the ego-machine, wherein the determining the second centerline occurs based at least on the at least one of the one or more static objects being located along the first path of the ego-machine or the one or more locations of the one or more static objects being within the threshold distance to the ego-machine.

9. The method of claim 1, further comprising:

determining a fourth edge associated with the first path and a fourth edge associated with the first path; and determining, based at least on one of the third edge or the fourth edge, a possibility of collision with the one or more static object, wherein the determining the second centerline occurs based at least on the possibility of collision.

10. A system comprising:

one or more processors to:

determine, based at least on first edges of a lane, a first line associated with a first path of an ego-machine;

determine, based at least on a width of the ego-machine, second edges associated with the first path of the ego-machine;

determine, based at least on one or more locations of one or more static objects located between the first edges of the lane, a first intersection between at least one of the second edges and a static object of the one or more static objects;

determine, based at least on the first intersection and by incrementally shifting the first path in a direction away from the one or more locations of the one or more static objects by a set distance using one or more shifting iterations, a second line associated with a second path of the ego-machine;

determine, based at least on the width of the ego-machine, third edges associated with the second path of the ego-machine;

determine, based at least on the one or more locations of the one or more static objects, that the third edges avoid a second intersection with the one or more static objects; and cause the ego-machine to navigate based at least on the second path.

11. The system of claim 10, wherein the determination of the second line comprises determining, based at least on the first intersection and by the incrementally shifting of the first line in the direction away from the one or more locations of the one or more static objects and by the set distance for a plurality of iterations, the second line that is at least a threshold distance away from the one or more locations of the one or more static objects.

12. The system of claim 11, wherein the determining the second line comprises:

determining, by shifting the first line in the direction away from the one or more locations of the one or more static objects and by the set distance, a third line associated with a third path for the ego-machine; and determining, by shifting the third line in the direction away from the one or more locations of the one or more static objects and by the set distance, the second line associated with the second path for the ego-machine.

13. The system of claim 10, wherein the one or more processors are further to:

determine, based at least on the one or more locations of the one or more static objects, one or more first areas of the lane that the one or more static objects occupy; and determine, based at least on increasing the one or more first areas, one or more second areas of the lane that are associated with the one or more static objects, wherein the first intersection is determined based at least on the one or more second areas and the first line.

14. The system of claim 10, wherein the second path is associated with at least one of a threshold distance that the ego-machine is to navigate past the one or more static objects or a threshold period of time that the ego-machine is to navigate after passing the one or more static objects.

15. The system of claim 10, wherein the one or more processors are further to:

determine, based at least on the first intersection, a possibility of collision with the one or more static objects, wherein the determination of the second line occurs based at least on the possibility of collision with the one or more static objects.

16. The system of claim 10, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

17. The system of claim 10, wherein the one or more processors are further to:

determine that the one or more locations of the one or more static objects are located closer to the first edge of the lane as compared to the second edge of the lane; and determine, based at least on the one or more locations of the one or more static objects, a third edge,

wherein the incrementally shifting of the first line is in the direction away from the third edge and towards the second edge.

18. The system of claim 10, wherein the one or more processors are further to:

determine, based at least on the third edges avoiding the second intersection, no possibility of collision between the ego-machine and the one or more static objects when navigating the second path, wherein the ego-machine is caused to navigate the second path based at least on the no possibility of collision.

19. One or more processors comprising:

processing circuitry to:

determine, based at least on first edges associated with a lane, a first centerline between the first edges and corresponding to a planned first path of an ego-machine;

determine, based at least on a presence of one or more static objects located within the first edges of the lane, second edges associated with the lane;

compute a shift direction and a shift distance for the first centerline based at least on the first centerline between the first edges and a center between the second edges associated with the lane;

determine, based at least on adjusting the first centerline by the shift direction and the shift distance, a second centerline between the second edges; and plan a second path for the ego-machine using the second centerline.

20. The one or more processors of claim 19, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *